United States Patent
Itou et al.

(10) Patent No.: US 7,486,351 B2
(45) Date of Patent: Feb. 3, 2009

(54) LIQUID CRYSTAL DISPLAY APPARATUS

(75) Inventors: Osamu Itou, Hitachi (JP); Junji Tanno, Narashino (JP); Hirotaka Imayama, Mobara (JP); Takahiro Ochiai, Chiba (JP); Masateru Morimoto, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 588 days.

(21) Appl. No.: 11/138,869

(22) Filed: May 25, 2005

(65) Prior Publication Data

US 2005/0264720 A1 Dec. 1, 2005

(30) Foreign Application Priority Data

May 25, 2004 (JP) .............................. 2004-154780

(51) Int. Cl.
*G02F 1/1335* (2006.01)
(52) U.S. Cl. ..................... 349/99; 349/114; 349/129; 349/141; 349/96

(58) Field of Classification Search ................... 349/99, 349/123, 114, 141, 96, 129, 143, 117
See application file for complete search history.

(56) References Cited

U.S. PATENT DOCUMENTS 6,914,656 B2 * 7/2005 Sakamoto et al. ........... 349/114

FOREIGN PATENT DOCUMENTS

JP 2002-207227 7/2002
JP 2002-333624 11/2002

* cited by examiner

*Primary Examiner*—Thoi V Duong
(74) *Attorney, Agent, or Firm*—Hogan & Hartson LLP

(57) ABSTRACT

A liquid crystal display apparatus includes a transmissive display portion having the same liquid crystal alignment directions and transmissive axes of the polarizers as the transmissive IPS liquid crystal display apparatus. Further, the liquid crystal layer of its reflective display portion has a retardation of a quarter wave. The liquid crystal alignment directions of the reflective display portion are set to be crossed with the transmissive axes of the polarizers in the transmissive display portion at an angle of 45 degrees.

3 Claims, 20 Drawing Sheets

LIQUID CRYSTAL DISPLAY APPARATUS

CROSS-REFERENCE TO RELATED APPLICATION

This application relates to U.S. patent application Ser. No. not yet assigned based on Japanese Patent Application No. 2004-154691 filed May 25, 2004 entitled "LIQUID CRYSTAL DISPLAY APPARATUS" by Osamu ITO et al., the disclosure of which is incorporated herein by reference.

BACKGROUND OF THE INVENTION

The present invention relates to a liquid crystal display apparatus capable of displaying an image in various kinds of environments in ranges from a light place to a dark place and realizing a high-quality transmissive display at a wide viewing angle.

Today, a transmissive liquid crystal apparatus with a wide viewing angle of such as an IPS (In-plane Switching) or an VA (Vertical Alignment) liquid crystal display is prevailing as a monitor. Such a liquid crystal apparatus with improved response performance is also used as a television. On the other hand, the liquid crystal display apparatus is also prevailing in the field of portable instruments such as a portable phone and a digital camera. Though the portable information instruments are mainly used by persons, today, those instruments are more and more requested to have the display portion with a variable viewing angle, in which it is requested to have a wide viewing angle because the display is often watched in the oblique direction.

The display apparatus provided in the portable information instrument is used in various kinds of environments in ranges from an outdoor place in a fine weather to a dark room. Hence, the display apparatus is requested to be transflective. The transflective liquid crystal display apparatus includes a reflective display portion and a transmissive display portion on one pixel. The reflective display portion reflects a ray of light incident from the circumference thereof through the use of a reflective layer, for displaying an image. The reflective display portion keeps the contrast ratio constant irrespective of the brightness therearound, so that the display portion may provide an excellent display in a relatively bright environment in ranges from an outdoor place to an indoor place in a fine weather. The transmissive display portion keeps the brightness constant irrespective of the ambient light through the use of a backlight, so that the display portion may provide a display of a high contrast ratio in a relatively gloomy environment in ranges from an indoor place to a dark room. Therefore, the transflective liquid crystal display apparatus provided with both of the reflective and the transmissive display portions may provide a display of a high contrast ratio in various kinds of environments in ranges from an outdoor place in a fine weather to a dark room.

Up to this time, by producing the IPS liquid crystal display apparatus has been known as a transmissive display with a wide viewing angle, and it's potential for a transflective display has been expected to obtain both the reflective display and the transmissive display with a wide viewing angle. For example, the JP-A-2002-333624 discloses the reflective IPS liquid crystal display apparatus.

The transflective IPS liquid crystal display apparatus includes a plurality of phase plates located wholly on the upper side and the lower side of the liquid crystal panel. However, the phase difference of the phase plate depends upon a viewing angle. Hence, even if the phase difference between a plurality of phase plates and a liquid crystal layer and an axial alignment thereof are optimized in the normal direction, the optimal condition for the dark image is being quickly shifted as the liquid crystal layer and the phase plates are being off the normal direction. The dependency of the phase difference upon a viewing angle may be reduced by adjusting the index of refraction in the thickness direction of the phase plate. However, the dependency cannot be completely eliminated. As a result, the transflective IPS liquid crystal display apparatus has an increased dark image transmittance in the viewing angle direction, in which the viewing angle of the transflective display portion is lower than that of the transmissive IPS liquid crystal display apparatus.

Further, the JP-A-2002-207227 discloses that the alignment of the liquid crystal layer in the reflective display portion is different from that in the transmissive display portion in the VA system. However, it does not disclose the application of those different alignments to the IPS system that provides a transmissive display with a wide viewing angle.

In the transmissive IPS liquid crystal display apparatus, the liquid crystal layer is homogeneously aligned, the transmissive axes of the upper and the lower polarization plates are located to be crossed with each other at right angles, and one of the transmissive axes is located in parallel to the liquid crystal alignment direction. The ray of light incident to the liquid crystal layer is linearly polarized light and its electric vector is located in parallel to the liquid crystal alignment direction. Hence, the liquid crystal layer does not bring about the phase difference. This makes it possible to realize a dark image of a low transmittance, bring about no extra phase different in the viewing angle direction because of no phase plate located between the liquid crystal layer and the polarizers, and thereby realize the dark image of a wide viewing angle. As described above, in essence, the transmissive IPS liquid crystal display apparatus does not need to locate any phase plate.

The transflective liquid crystal display apparatus includes the reflective display portion and the transmissive display portion on one pixel, in which the optical condition for the dark image is essentially different between the reflective display portion and the transmissive one. That is, in the reflective display portion, a ray of light is entered from the polarizer located on the top of the liquid crystal display apparatus, reflected on the reflective plate inside the liquid crystal panel, passed through the polarizer located on the top thereof again, and then reaches the user. In the transmissive display portion, a ray of light is entered from the polarizer located on the bottom of the liquid crystal display apparatus, passed through the polarizer located on the top thereof, and then reaches the user.

The foregoing difference of a light pass causes the reflective display portion to have a light phase difference bringing about the dark image being different by a quarter wave from the transmissive display portion. Hence, when the reflective display portion stays in the bright image, the transmissive display portion stays in the dark image, or vice versa. It means that the reflective display portion has different dependency on the applied voltage from the transmissive display portion. In order to keep the dependency on the applied voltage identical in both of the display portions, it is necessary to shift the phase difference between the reflective display portion and the transmissive display portion by a quarter wave by any means.

The conventional transflective IPS liquid crystal display apparatus includes the phase plates located wholly on the upper and the lower surfaces of the liquid crystal panel. The phase plate located on the top of the liquid crystal panel passes through a ray of light entered from the outside to the reflective display portion, the ray of light reflected on the reflective plate of the reflective display portion, and the ray of light having been passed through the transmissive display portion. As described above, the upper phase plate is effective in both of the reflective display portion and the transmissive display portion. On the other hand, since only the source light entered into the transmissive display portion is passed through the phase plate located on the lower side of the liquid crystal panel, the lower phase plate is effected only in the transmissive display portion.

By using the foregoing difference of the effect between the upper phase plate and the lower one against the reflective display portion and the transmissive one, the phase difference therebetween is shifted by a quarter wave. However, since the phase plate is located between the liquid crystal layer and the polarizer, the extra phase difference occurs in the viewing angle direction, which leads to lowering the viewing angle performance on the dark image.

SUMMARY OF THE INVENTION

As described above, the conventional transflective liquid crystal display apparatus disables to realize as a wide viewing angle as the transmissive IPS liquid crystal display apparatus. It is therefore an object of the present invention to provide a transflective liquid crystal display apparatus which realizes as a wide viewing angle as the transmissive IPS liquid crystal display apparatus.

According to the present invention, the alignment of the liquid crystal of the reflective display portion is different from that of the transmissive display portion in the transflective IPS liquid crystal display apparatus. The polarizer is located wholly on the upper and the lower surfaces of the liquid crystal panel, the transmissive axes of the upper and the lower polarizers, crossed perpendicularly each other and one of the polarizers is located in parallel to the alignment direction of the liquid crystal of the transmissive display portion.

The foregoing location causes the location of the polarizer and the liquid crystal layer in the transmissive display portion to be likewise to the transmissive IPS liquid crystal display apparatus. This makes it possible to obtain the same applied voltage characteristic of a normally closed type (in which type the dark image appears when the applied voltage is zero) and the same transmissive display of the wide viewing angle as those of the transmissive IPS liquid crystal display apparatus.

Preferably, the reflective display portion, as a state of liquid crystal alignment, is aligned to have a degree of 45 between the alignment direction and the transmissive axis of the polarizer on the border of the liquid crystal layer located closer to the light incident plane. Practically, however, the alignment direction is adjusted to keep the degree between 40 to 50 as allowing for an error ±10% on the manufacturing process. Further, the retardation of the liquid crystal layer is kept as a quarter wave. This causes the liquid crystal layer and the polarizer located closer to the liquid crystal layer to be functioned as a circular polarizer, which results in allowing the liquid crystal layer to offer the dark image when no voltage is applied. When the liquid crystal layer starts to rotate by applying a voltage, the function as the circular polarizer is lost, so that the reflected light is increased. That is, the reflective display portion is changed to have the normally closed applied voltage characteristic like the transmissive display portion.

For aligning both of the reflective display portion and the transmissive display portion homogeneously and making the alignment direction of one display portion different by 45 degrees from that of the other display portion, it is necessary to divide the alignment direction on two boundaries of the liquid crystal layer. This makes the manufacturing process intricate. The reflective display portion is adjusted to keep a twisted alignment of 45 degrees, form a degree of 45 between only the border closer to the light incident plane and the liquid crystal alignment direction of the transmissive display portion, and keep the liquid crystal alignment direction same as that of the transmissive display portion on the opposite border. Also in this case, if the twisted pitch of the liquid crystal layer in the reflective display portion is long enough, the liquid crystal layer and the polarizer closer thereto are functioned as a circular polarizer, which results in realizing the normally closed applied voltage characteristic. Further, since the division of the alignment is carried out on the border of one side, the manufacturing process is made simpler.

Since the birefringence of the liquid crystal layer depends upon the wavelength, the retardation of the liquid crystal layer is made to be a quarter wave only in one point of the visible wavelength range. Assuming that the wavelength that makes the retardation of the liquid crystal layer a quarter wave is 550 nm at which the visual sensitivity becomes maximum, on the wavelength range being off 550 nm on the dark image, the reflectance may be increased even on the dark image, and therefore the dark image may be viewed to be colored in some light incident conditions.

In the case of displaying a color image through the use of color filters, each color filter allows only the ray of light with about one third as long a wavelength range as the visible wavelength range to be mainly passed. By making the liquid crystal thickness of the reflective display portion variable in respective color filters by changing the layer thickness of the color filter according to each color and making the retardation of the liquid crystal layer a quarter wave in the essential transmissive wavelength of each color filter, it is possible to sufficiently absorb light of a substantially overall visible wavelength, thereby being able to eliminate the coloring of the dark image.

The threshold voltage of the IPS liquid crystal display apparatus depends upon an angle formed between the electric field applying direction and the liquid crystal alignment direction. For example, if the angle formed between the electric field applying direction and the liquid crystal alignment direction is 90 degrees, the effective permittivity anisotropy of the liquid crystal layer becomes maximum. However, since the clockwise alignment changes with similar ease to the counterclockwise alignment, the liquid crystal layer is divided into a plurality of fine areas whose alignment states are different when a voltage is applied. For preventing this division, it is necessary to make the angle formed between the electric field applying direction and the liquid crystal alignment direction smaller than 90 degrees, for example, keep the angle formed therebetween in the range of 80 to 90 degrees, which results in keeping the alignment uniform when a voltage is applied.

As the angle formed between the electric field applying direction and the liquid crystal alignment direction is made smaller, the effective permittivity anisotropy of the liquid crystal layer is made smaller accordingly, which results in increasing the threshold voltage. If the angle formed between the electric field applying direction and the liquid crystal alignment direction is kept the same angle in the reflective display portion and the transmissive display portion, the threshold voltage of the reflective display portion may be made equal to the threshold voltage of the transmissive display portion.

For example, consider the case that the liquid crystal alignments of the reflective display portion and the transmissive display portion are homogeneous. In a case that the direction of a combshaped pixel electrode of the reflective display portion is the same as that of the transmissive display portion, by keeping the angle formed between the electric field applying direction and the liquid crystal alignment direction 67.5 degrees, the angle formed between the electric field applying direction and the liquid crystal alignment direction in the reflective display portion is made equal to the angle in the transmissive display portion. However, the angle of 67.5 degrees makes the effective permittivity anisotropy of the liquid crystal layer small and thereby often makes the threshold voltage too high. For example, the angle of 75 degrees both in the reflective display portion and the transmissive display portion makes it possible to reduce the threshold voltage. In order to realize this, the direction of the comb-shaped pixel electrode in the reflective display portion may be made different from that in the transmissive display portion.

According to the present invention, the all-environment type liquid crystal display apparatus is provided which enables to display an image in various kinds of environments in ranges from an outdoor place in a fine weather to a dark room and realize so wide a viewing angle in the transmissive display as the ordinary monitor.

The liquid crystal display apparatus according to the present invention allows a user to carry a high-quality display device like an ordinary monitor. The application of this liquid crystal display apparatus to the display device of a portable phone also allows high-quality image information to be reproduced and a user to treat image information of higher quality. The use of this high-quality display device for a digital camera makes it easy to make sure of an image before being shot and/or a shot image. In future, it is presumed that the prevail of the surface wave digital broadcast leads to greatly improving the receiving state of the portable TV. The use of this liquid crystal display apparatus for a portable TV makes it possible to reproduce the high-quality image information at any place.

Other objects, features and advantages of the invention will become apparent from the following description of the embodiments of the invention taken in conjunction with the accompanying drawings.

DETAILED DESCRIPTION OF THE EMBODIMENTS

Hereafter, the embodiments of the present invention will be described with reference to the appended drawings.

First Embodiment

Figure 1:
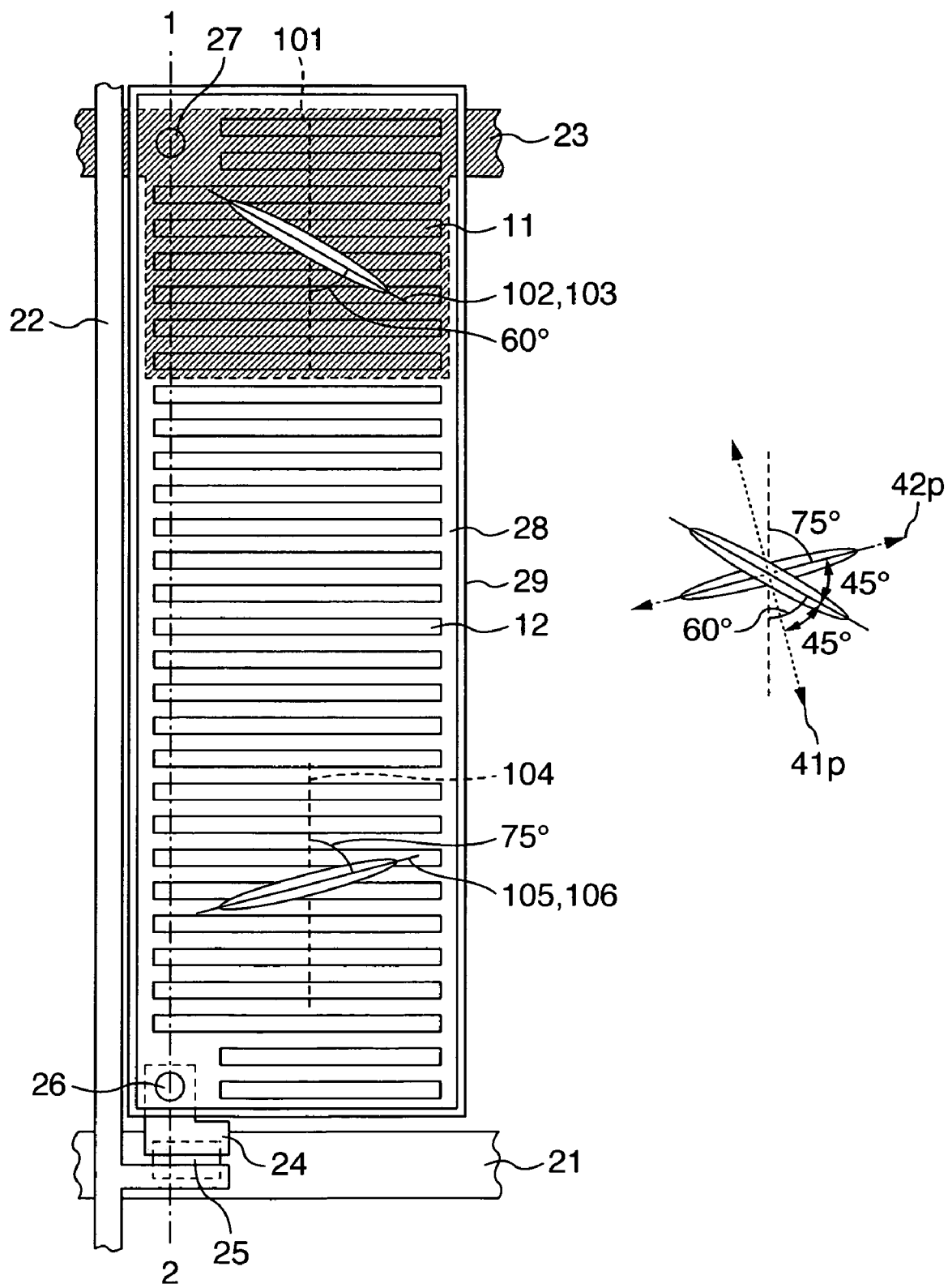
FIG. 1 is a view showing various lines, an electrode distribution and an alignment direction on one pixel located on a second substrate of a liquid crystal display apparatus according to a first embodiment of the present invention.
Figure 2:
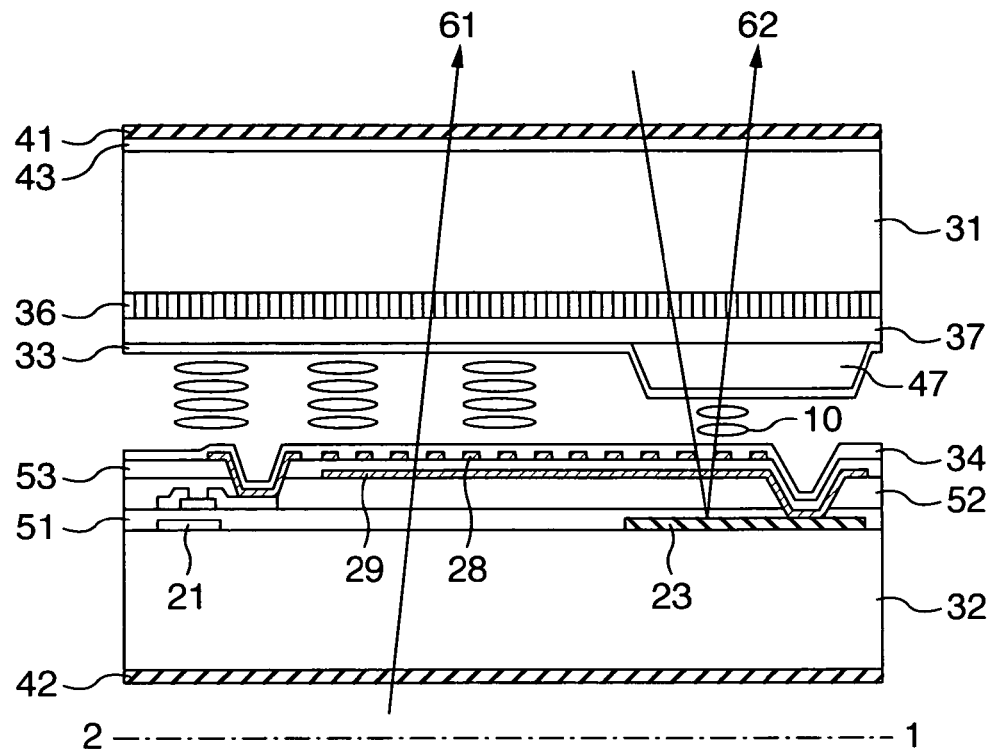
FIG. 2 is a view showing a sectional structure of the liquid crystal display apparatus according to the present invention.

A section of one of the pixels composing the liquid crystal display (referred to as LCD) apparatus according to the present invention is illustrated in FIG. 2. A top view of a second substrate 32 shown in the section of FIG. 2 is illustrated in FIG. 1, in which view the second substrate 32 is observed from the normal direction. The section of FIG. 1 on a dashed line 1-2 corresponds to FIG. 1. As shown in FIG. 2, the LCD apparatus according to the present invention is mainly composed of a first substrate 31, a liquid crystal layer 10 and the second substrate 32, in which apparatus the liquid crystal layer 10 is laid between the first and the second substrates 31 and 32.

The first substrate 31 includes a color filter 36, a leveling layer 37 and a first alignment layer 33 on the side closer to the liquid crystal layer 10. The second substrate 32 includes a thin film transistor on the side closer to the liquid crystal layer 10. The thin film transistor is connected with a scanning line 21, a signal line 22 and a pixel electrode 28. Moreover, common lines 23 and a common electrode 29 are included in the thin film transistor.

The thin film transistor has an anti-stagger structure, in which transistor its channel is formed of an amorphous silicon layer. The scanning line 21 is crossed with the signal line 22, and the thin film transistor is substantially located on the crossed portion. The common lines 23 are distributed in parallel to the scanning line and are connected with the common electrode 23 through a second through hole 27. The pixel electrode 28 is connected with the thin film transistor in a first through hole 26. On the pixel electrode 28 is located a second alignment layer 34, which is closer to the liquid crystal layer, for regulating the alignment direction of the liquid crystal.

The first substrate 31 is formed of bolosilicate glass with little ionic impurity and has a thickness of 0.5 mm. The color filter 36 includes a red, a green and a blue portions repetitively arranged in a stripped manner. Each stripe is located in parallel to the signal electrode. The concavo-convex portion resulting from the color filter 36 is leveled by the leveling layer 37 formed of resin. The first alignment layer 33 is formed of polyimide organic layer and is aligned by the rubbing technique so that the closer liquid crystal layer 10 may be aligned in the alignment direction specified by the rubbing technique.

Like the first substrate 31, the second substrate 32 is formed of bolosilicate glass and has a thickness of 0.5 mm. Like the first alignment layer 33, the second alignment layer 34 is formed of a polyimide organic layer with a horizontal alignment characteristic. The signal line 22, the scanning line 21 and the common line 23 are formed of chromium and the pixel electrode 28 is a transparent electrode formed of indium tin oxide (ITO). A part of the common electrode 29 is formed of ITO.

The pixel electrode 28 includes a group of slits 12 located in parallel to the scanning line 21. Those slits 12 are spaced at a pitch of about 4 μm. The pixel electrode 28 is isolated from the common electrode 29 through a third insulating layer 53 with a thickness of 0.5 μm. When a voltage is applied onto these electrodes, an electric field occurs between the pixel electrode 28 and the common electrode 29. However, the effect of the third insulating layer 53 causes the electric field to be distorted in the arched manner and thereby to be passed through the liquid crystal layer 10. This causes the alignment of the liquid crystal layer 10 to be changed when a voltage is applied.

The common line 23 is structured to extend into the pixel electrode at the portion of the line 23 crossed with the pixel electrode 28 so that the extended portion may reflect the light as shown by the reflected light 62 of FIG. 2. In FIGS. 1 and 2, the overlaid portion between the common line 23 and the pixel electrode 28 corresponds to the reflective display portion. The other overlaid portion between the pixel electrode 28 and the common electrode 29 corresponds to a transmissive display portion through which backlight is passed as shown by the transmitted light 61 of FIG. 2.

Since the transmissive display portion has a different optimal thickness of the liquid crystal layer from the reflective display portion, a stepped portion is formed on the boundary therebetween. For shortening the boundary therebetween, the transmissive display portion and the reflective display portion are located so that the boundary may be in parallel to a short side of the pixel.

The use of the reflective plate for the lines such as the common lines 23 provides the effect of simplifying the manufacturing process. The common line 23 formed of aluminum with a high reflectance provides a brighter reflective display. The same effect may be provided by the common line 23 formed of chromium and the reflective plate formed of aluminum or silver alloy separately from the common line 23.

The liquid crystal layer 10 is composed of a liquid crystal composite whose dielectric constant in the alignment direction indicates a larger positive dielectric constant anisotropy than that in the normal direction. The composite has a birefringence of 0.067 at a temperature of 25° C. and indicates a nematic phase in a wide temperature range including a room temperature. Further, in the driving condition with the thin film transistor, for example, at a driving frequency 60 Hz with 240 scanning lines, the composite indicates a resistance that is high enough to hold sufficient reflectance and transmittance during the holding period and to prevent flickers.

The first and the second alignment layers 33 and 34 are treated by the rubbing technique so that both of these layers may have different alignment directions from each other in the reflective display portions and the transmissive display portions. A mask with an opening is located only on the transmissive display portions of the first and the second substrates 31 and 32 so that only the transmissive display portion may be treated by the rubbing technique. Then, a mask with an opening is located only on the reflective display portion so that only the reflective portion may be treated by the rubbing technique. These treatments allow the rubbing direction of the reflective display portion to be crossed with that of the transmissive display portion at an angle of 45 degrees. Afterwards, the first substrate 31 is combined with the second substrate 32 and a liquid crystal material is sealed in the combination for forming the liquid crystal layer 10.

The alignment directions and the liquid crystal alignment states of the reflective display portion and the transmissive display portion are also shown in FIG. 1. At first, focusing attention on the transmissive display portion, the alignment direction 105 of the first alignment layer 33 is in anti-parallel to the alignment direction 106 of the second alignment layer 34. As a result, as shown in FIG. 1, the liquid crystal layer is aligned homogeneously with a twist angle of 0 degree. The direction 104 of the electric field formed between the pixel electrode 28 and the common electrode 29 is perpendicular to the slits 12 of the transmissive display portion as viewed from the normal direction of the substrate, while the alignment direction of the liquid crystal in the transmissive display portion is crossed with the direction of the electric field at an angle of 75 degrees.

In turn, focusing attention on the reflective display portion, the alignment direction 102 of the first alignment layer 33 is in anti-parallel to the alignment direction 103 of the second alignment layer 34, so that the liquid crystal layer is aligned homogeneously. The direction 101 of the electric field formed between the pixel electrode 28 and the common electrode 29 is perpendicular to the slits 12 of the transmissive display portion as viewed from the normal direction of the substrate. The alignment direction of the liquid crystal in the transmissive display portion is crossed with the direction of the electric field at an angle of 60 degrees.

Outside of the first and the second substrates 31 and 32 are located the first and the second polarizers 41 and 42. The transmissive axis 41p of the first polarizer 41 is located perpendicularly to the alignment direction of the liquid crystal in the transmissive display portion, while the transmissive axis 42p of the second polarizer 42 is located in parallel thereto.

The first polarizer 41 includes a light-diffusive adhesive layer 43 having lots of transparent minute balls whose refractive index is different from that of the adhesive layer 43. The refraction caused on the boundary between the adhesive material and the minute balls by the difference of the refractive index between the adhesive layer and the minute balls has an effect on expanding the incident light path. This makes it possible to reduce the iridescent coloring caused by the interference of the reflected light in the pixel electrode 28 and the common electrode 29.

Focusing attention on the transmissive display portion of the transflective LCD apparatus according to this embodiment having produced as described above, the transmissive display portion is composed of the homogeneously aligned liquid crystal layer 10 and the first and the second polarizers 41 and 42. The transmissive axis 41p of the first polarizer 41 is crossed at right angles with the transmissive axis 42p of the second polarizer 42, which is located in parallel to the alignment direction of the liquid crystal in the transmissive display portion. Since this has the same composition as the transmissive IPS system, like the transmissive IPS system, the viewing angle of the transmissive display is wide enough to be used as a monitor.

In turn, focusing attention on the reflective display portion, the reflective display portion is composed of the homogeneously aligned liquid crystal layer 10 and the first polarizer 41. It is preferable to locate the alignment directions 102 and 103 of the liquid crystal layer 10 and the transmissive axis 41p of the first polarizer 41 so that the alignment directions 102 and 103 may be crossed with the transmissive axis 41p at an angle of 45 degrees. Practically, however, considering the error ±10% on the manufacture, they are located to be crossed with each other at an angle in the range of 40 to 50 degrees. For reducing the retardation of the liquid crystal layer of the reflective display portion into a quarter wave, in the reflective display portion, the lamination of the liquid crystal layer 10 and the first polarizer 41 is made to be a circular polarizer. When a voltage is applied, in the wavelength of 550 nm in which a human's visual sensitivity becomes maximum, the incident light is made to be the circularly polarized light. In the other wavelength, the incident light is made to be the polarized light closer to the circularly polarized light and then enters into the reflective plate. When the reflected light is incident to the first polarized plate 41 again, in the wavelength of 550 nm, the incident light is made to be the linear polarized light whose electric vector is in parallel to the absorption axis of the first polarizer 41. Hence, the incident light is absorbed by the first polarizer 41 and thus the dart display may be realized.

Figure 3:
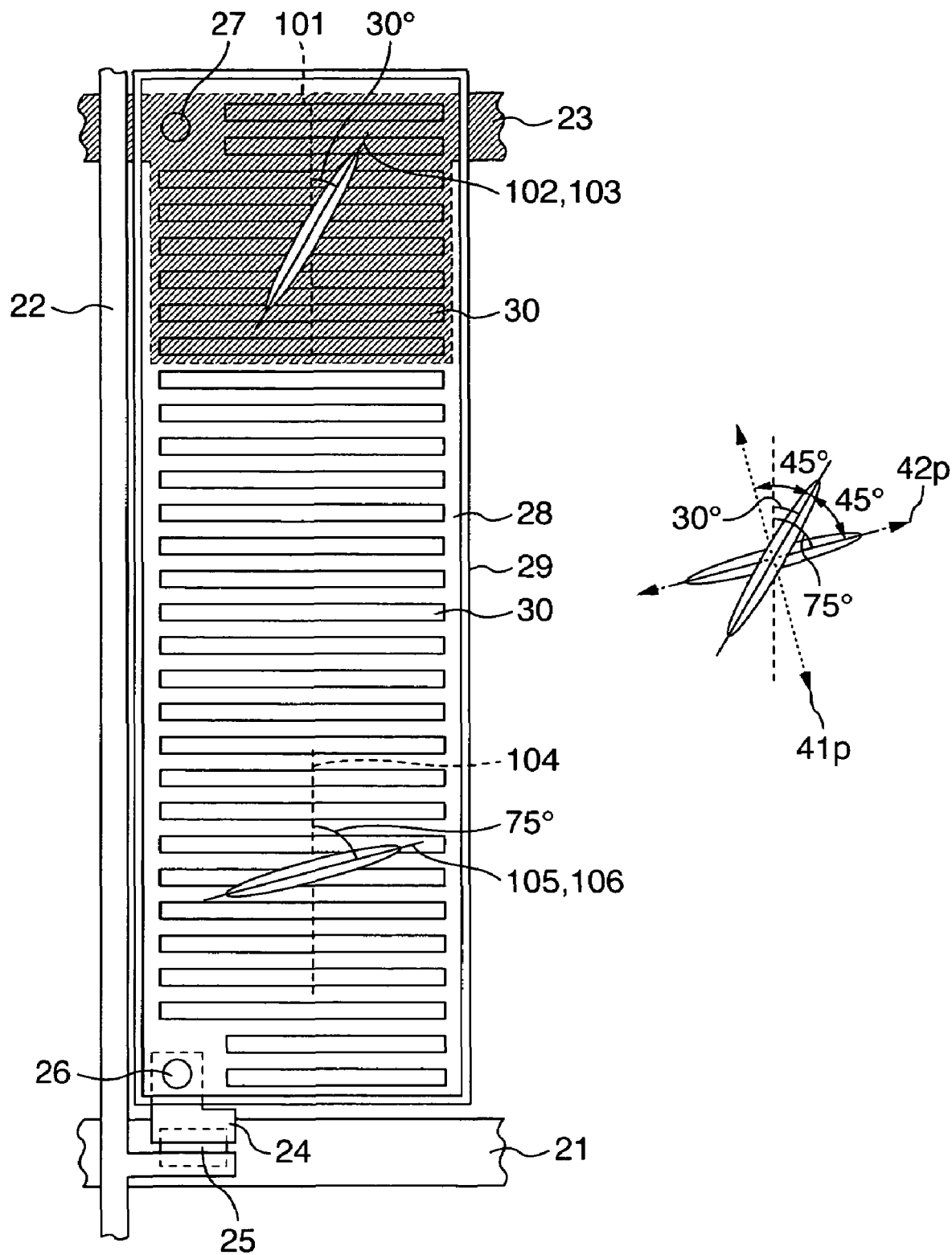
FIG. 3 is a view showing various lines, an electrode distribution and an alignment direction on one pixel located on the second substrate of the liquid crystal display apparatus according to the first embodiment of the present invention.

In the transmissive display portion, the electric field direction is crossed with the alignment direction of the liquid crystal at an angle of 75 degrees. In the reflective display portion, the alignment direction of the liquid crystal is crossed with the transmissive display portion at an angle of 45 degrees. In addition to the location shown in FIG. 1, the location shown in FIG. 3 is provided. In this case, in the reflective display portion, the electric field direction is crossed with the alignment direction of the liquid crystal at an angle of 30 degrees. Hence, the effective dielectric anisotropy is far smaller than that in the location shown in FIG. 1. Hence, the threshold voltage in the reflective display is increased. It means that the location shown in FIG. 1 is more preferable than the location shown in FIG. 3.

The transflective LCD apparatus manufactured as described above is connected to the driving device and the backlight is located behind the LCD apparatus. Then, the display state of this arrangement is observed. When viewed in a bright place in the state that the backlight is turned off, the display image on the reflective display was assured. Then, when observed in a dark place in the state that the backlight unit is turned on, the display image on the transmissive display was assured. If the observatory direction against the normal of the substrate is changed in a wide range, no tone reverse took place and the lowering of the contrast ratio was suppressed.

COMPARATIVE EXAMPLE 1

Figure 4:
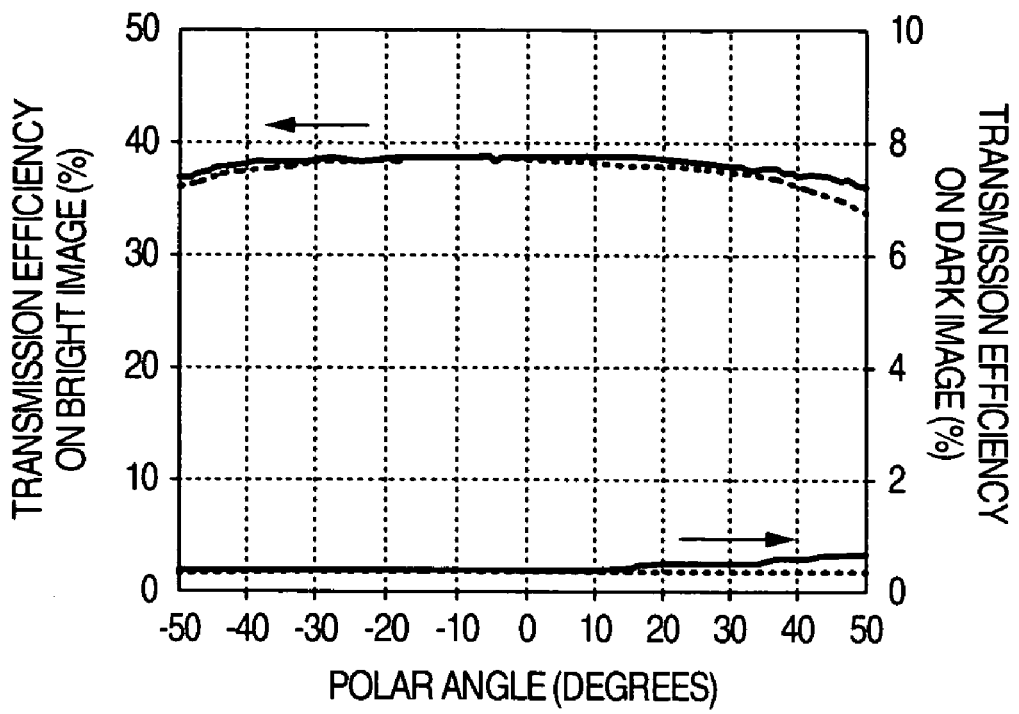
FIG. 4 is a graph showing a viewing angle characteristic of a dark image transmittance of the liquid crystal display according to the present invention.
Figure 21:
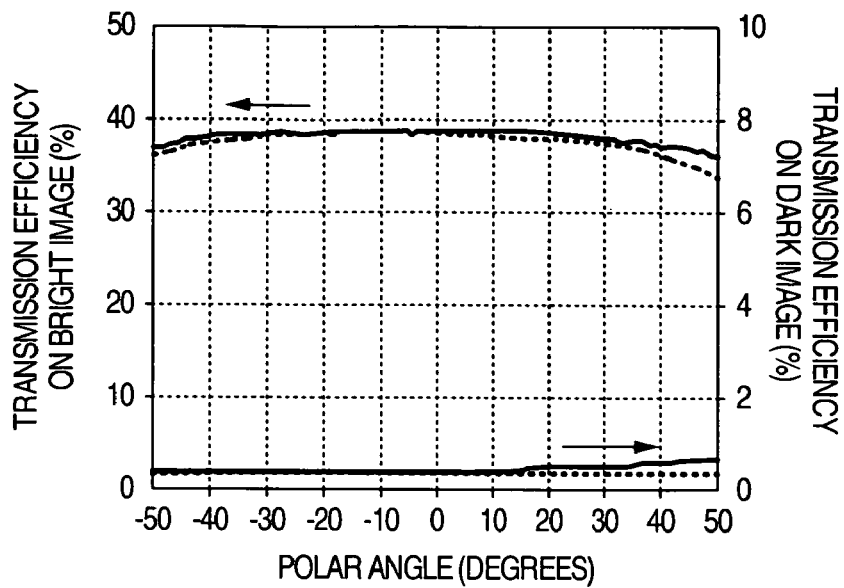
FIG. 21 is a graph showing a viewing angle characteristic of a dark image transmittance in a transmissive IPS liquid crystal display apparatus.

Next, the viewing angle characteristic against the transmittance on the dark image was estimated. FIG. 4 illustrates dependency of a transmittance on the dark image upon a polar angle together with the values measured at different azimuth angles. It is indicated that the transmittance on the dark image is sufficiently lowered at any azimuth angle. For comparison, the dependency of a transmittance upon a polar angle of the transmissive IPS is illustrated in FIG. 21. As is obvious from the comparison between FIG. 4 and FIG. 21, the transflective LCD apparatus of this embodiment provides the same transmissive display characteristic as the transmissive IPS LCD apparatus.

COMPARATIVE EXAMPLE 2

As a cited reference, the conventional transflective LCD apparatus was manufactured in which the reflective display portion has the same liquid crystal alignment direction as the transmissive display portion and the phase plate is located on the overall outsides of the first and the second substrates. The section of this transflective LCD apparatus is shown in FIG. 22.

A first phase plate 44 was located between the first substrate 31 and the first polarizer 41. The retardation of the first phase plate is a half wave and its slow axis forms an angle of 60 degrees clockwise against the liquid crystal alignment direction. Further, the transmissive axis of the first polarizer 41 was changed so that the transmissive axis may be located to form an angle of 75 degrees clockwise against the liquid crystal alignment direction. Moreover, between the second substrate 32 and the second polarizer 42 were located a second phase plate 45 and a third phase plate 46 in the closer sequence to the second substrate 42. The retardation of the second phase plate 45 is equal to that of the liquid crystal layer and its slow axis is crossed with the alignment direction of the liquid crystal layer 10 at right angles.

The third phase plate 46 has the same retardation as the first phase plate 44. The slow axis of the third phase plate 46 is crossed with that of the first phase plate 44 at right angles. The first, second and third phase plates 44, 45 and 46 were formed of polycarbonate system organic macromolecular material that may widely control the ratio of the refractive index of the in-plane direction to the thickness direction. In the first phase plate 44, a refractive index in the thickness direction is made equal to that on the in-plane fast axis. In the second and the third phase plates 45 and 46, the refractive index in the thickness direction is made equal to that on the in-plane slow axis.

Figure 22:
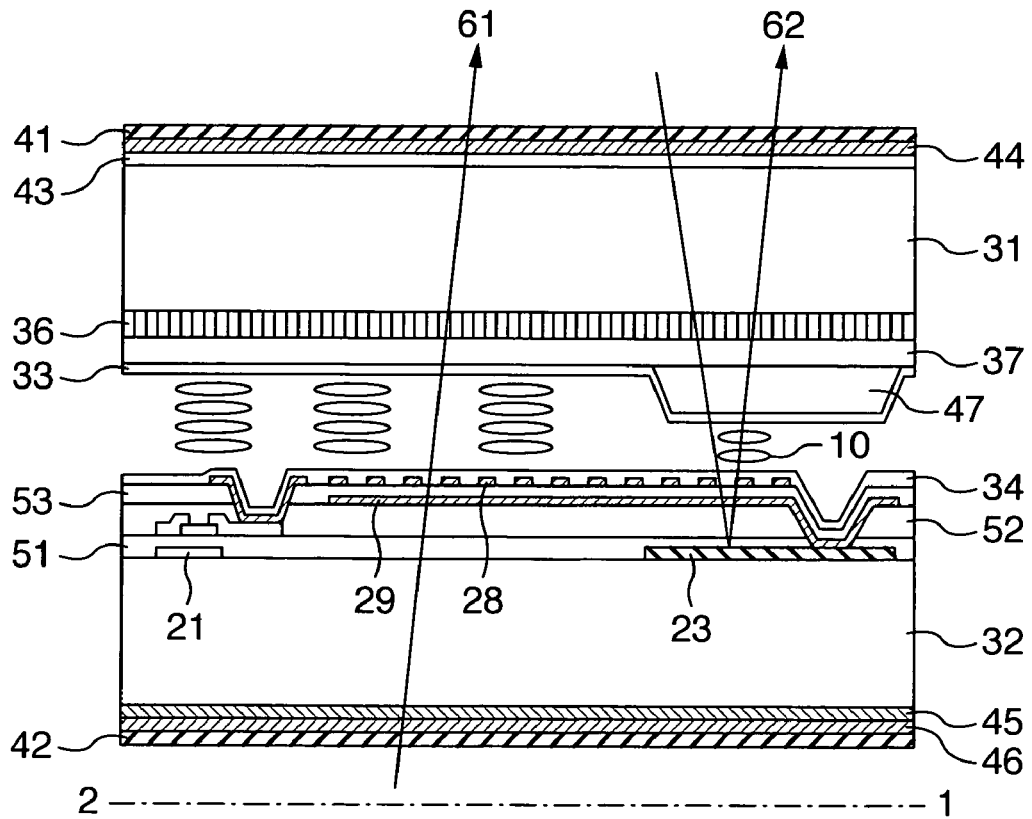
FIG. 22 is a view showing a sectional structure of the conventional liquid crystal display apparatus.

The conventional transflective LCD apparatus shown in FIG. 22 is different from the transflective LCD apparatus according to the present invention in a respect that the reflective display portion has the same liquid crystal alignment state as the transmissive display portion and three phase plates are provided. The reflective display and the transmissive display are required to keep the dark image at the same applied voltage. For the reflective display portion, the retardation of the liquid crystal layer required for the dark image is a quarter wave, while for the transmissive display portion, the retardation is zero. If the reflective display portion has the same liquid crystal alignment state as the transmissive display portion, these conditions are not met only by the liquid crystal layer. Hence, the phase plates are required. By optimizing each retardation and the slow axis azimuth of the lamination of the phase plates and the liquid crystal layer, the foregoing conditions may be met.

Figure 23:
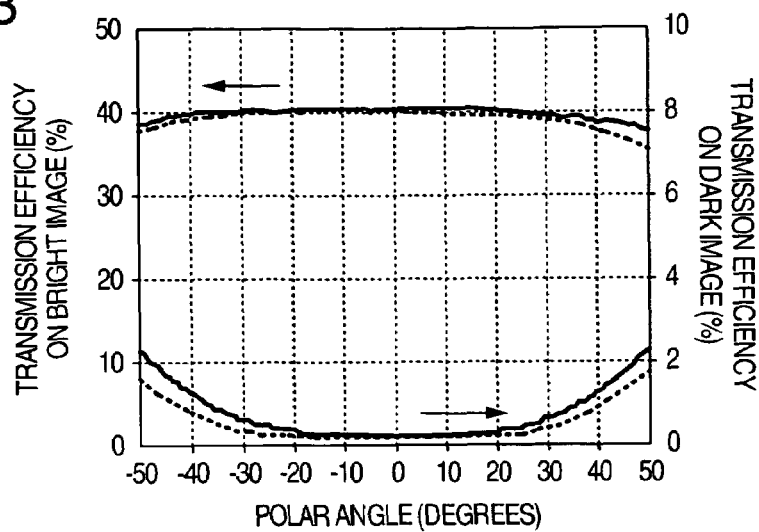
FIG. 23 is a graph showing a viewing angle characteristic of a dark image transmittance of the conventional liquid crystal display apparatus.

The estimation of the viewing angle characteristic of the transmittance on the dark image in the foregoing conventional transflective LCD apparatus is shown in FIG. 23. As shown, at some azimuth angles, with increase of a polar angle, the transmittance on the dark image is abruptly increased. At some viewing angle directions, the contrast ratio is made lower. As is obvious from the comparison between FIG. 2 and FIG. 4, the viewing angle characteristic of the conventional transflective LCD apparatus is greatly degraded in comparison with the transflective LCD display of the present invention.

The foregoing phenomena are brought about by the following causes. In the conventional transflective LCD apparatus, the first outside phase plate 44, the second outside phase plate 45 and the third outside phase plate 46 are located in the transmissive display portion. If the azimuth and the retardation of the slow axis are determined so as to compensate for the phase difference of the lamination of them in the normal direction, the phase difference is not compensated in the viewing angle direction.

As described above, in this embodiment, the liquid crystal alignment of the transmissive display portion is shifted by 45 degrees with respect to that of the reflective display portion. By locating the upper and the lower polarizers in the transmissive display portion like the transmissive IPS LCD apparatus, this embodiment realizes the transmissive display of a wide viewing angle and the reflective display in a bright place which are comparable to those of the transmissive IPS LCD apparatus.

COMPARATIVE EXAMPLE 3

Focusing attention on the dependency of transmittance on dark image upon a liquid crystal layer thickness, the LCD apparatus of the present invention was compared with the conventional transflective LCD apparatus in which the phase plates are located on the overall outsides of the first and the second substrates.

For the conventional transflective LCD apparatus, since the ray of light incident to the liquid crystal layer is elliptically polarized light, the liquid crystal layer brings about the phase difference, and if the phase difference is changed with variation of a thickness of a liquid crystal layer, the transmittance on the dark image is greatly varied.

Figure 24:
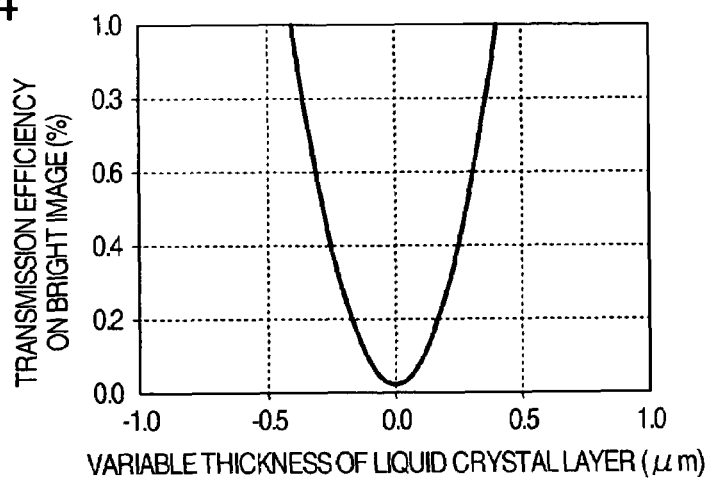
FIG. 24 is a graph showing dependency of a dark image transmittance upon a liquid crystal thickness in the conventional liquid crystal display apparatus.

The dependency of the transmittance on the dark image upon a liquid crystal layer thickness is shown in FIG. 24. As shown, for the conventional transflective LCD apparatus, if the actual thickness of the liquid crystal layer is shifted from the design value, the transmittance on the dark image is easily increased and the contrast ratio is made lower. For example, though the thickness of the liquid crystal layer may be varied on a display surface, in this case, the contrast ratio is made not even on the display surface. Hence, it is observed that unevenness on the dark image appears. The unevenness gives a user a visually uncomfortable feeling.

Figure 5:
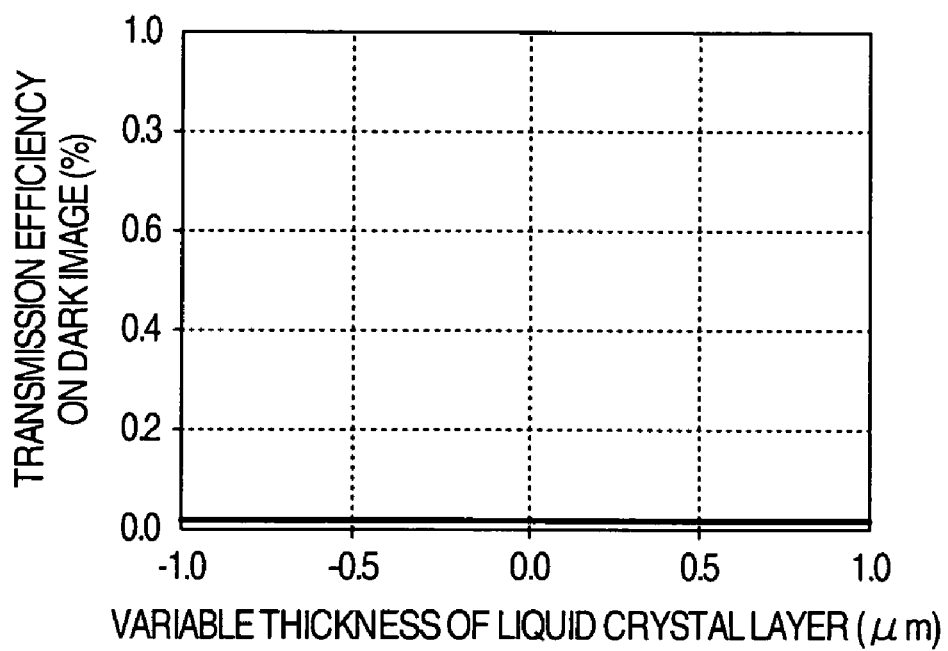
FIG. 5 is a graph showing dependency of a dark image transmittance on a liquid crystal layer in the liquid crystal display apparatus according to the present invention.

On the other hand, for the present invention, the ray of light incident to the liquid crystal layer in the transmissive display portion is linearly polarized light, and its electric vector is in parallel to the alignment direction of the liquid crystal layer. Since only one of the ordinary ray of light and the extraordinary ray of light takes place, the liquid crystal layer does not give rise to the phase difference. Hence, as shown in FIG. 5, the variation of the thickness of the liquid crystal layer hardly varies the transmittance on the dark image. Hence, the present invention is characterized in that the contrast ratio is not easily made lower and the unevenness on the dark image is substantially prevented even if the thickness of the liquid crystal layer is varied on the display surface.

As described above, the LCD apparatus according to the present invention provides a wide viewing angle of the transmissive display and an even dark image.

COMPARATIVE EXAMPLE 4

The application of the LCD apparatus to a portable phone or the like needs to be thin and lightweight. Hence, focusing attention onto the thickness of the liquid crystal panel, the LCD apparatus of the present invention was compared with the conventional transflective LCD apparatus in which the phase plates are located on the overall outsides of the first and the second substrates. Herein, the liquid crystal panel means a portion laid between the first and the second polarizers.

The first or the second substrate has a thickness of 0.5 mm, the first or the second polarizer has a thickness of 0.12 mm, and the first, the second or the third phase plate has a thickness of 0.05 mm. The thickness of the liquid crystal panel is substantially determined by those component members. The color filters formed on the first substrate or the thin film transistors and various lines and insulating films formed on the second substrate have a thickness of several μm, which thickness hardly influences the thickness of the liquid crystal panel.

The conventional transflective LCD apparatus includes the first and the second substrates and the first and the second polarizers and further the first to the third phase plates. The resulting thickness of the liquid crystal panel is 1.39 mm.

On the other hand, the LCD apparatus according to the present invention includes the first to the third phase plates. Hence, the actual thickness of the liquid crystal panel is as thin as 1.24 mm. This is the feature of the LCD apparatus according to the present invention.

Second Embodiment

In the first embodiment, the reflective display portion has the different alignment direction of the liquid crystal from the transmissive display portion. Hence, in both of the first and the second alignment layers 33 and 34, the reflective display portion and the transmissive display portion are respectively treated by the rubbing technique with a mask. This treatment results in increasing the steps of the manufacturing process.

Figure 6:
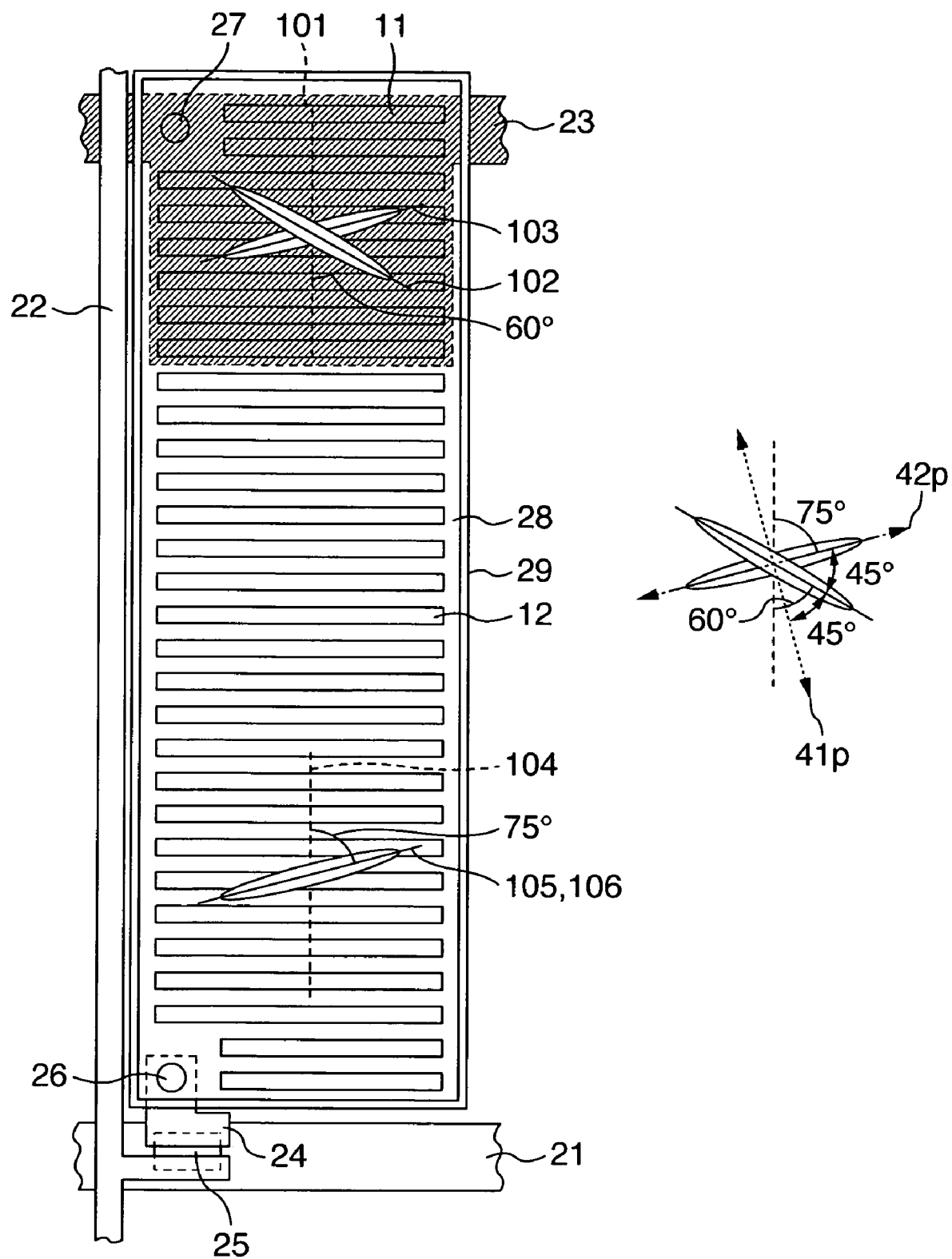
FIG. 6 is a view showing various lines, an electrode distribution and an alignment direction on one pixel located on a second substrate of a liquid crystal display apparatus according to a second embodiment of the present invention.

The alignment direction and the liquid crystal alignment state in the reflective display portion and the transmissive display portion of the LCD apparatus according to this embodiment are shown in FIG. 6. In this embodiment, only the first alignment layer 33 is differently aligned between the reflective display portion and the transmissive display portion. The second alignment layer 34 is uniformly aligned on the overall surface. This results in reducing the steps of the manufacturing process. That is, like the first embodiment, for the first alignment layer 33, the alignment direction in the reflective display portion is shifted by 45 degrees with respect to the alignment direction on the transmissive display portion. Unlike the first embodiment, the second alignment layer 34 is aligned on the overall surface in the same direction so that the alignment direction in the reflective display portion may be made equal to the alignment direction of the first alignment layer 33 in the transmissive display portion.

In the transmissive display portion, the alignment direction 105 of the first alignment layer 33 is in anti-parallel to the alignment direction 106 of the second alignment layer 34. Like the first embodiment, hence, the liquid crystal layer 10 is aligned homogeneously. In the reflective display portion, the alignment direction 103 of the first alignment layer 33 is shifted by 45 degrees with respect to the alignment direction 102 of the second alignment layer 34. The liquid crystal layer 10 is twistedly aligned with a twist angle of 45 degrees.

Figure 7:
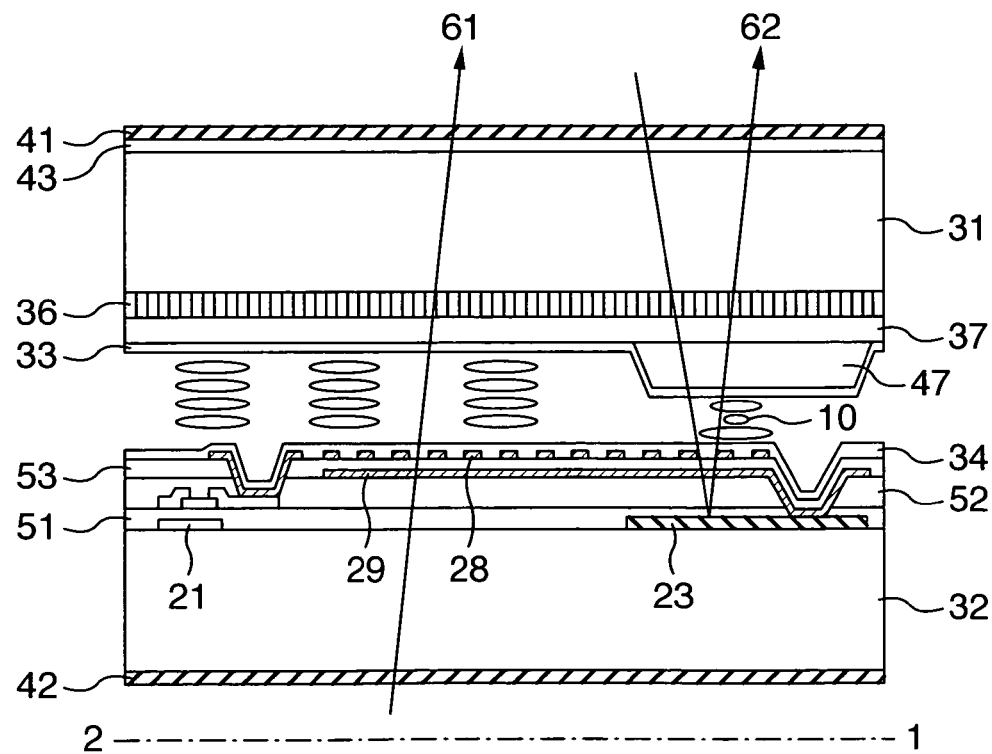
FIG. 7 is a view showing a sectional structure of the liquid crystal display apparatus according to the present invention.

The section of the LCD apparatus according to this embodiment is shown in FIG. 7. As shown, the alignment direction of the liquid crystal layer 10 is modeled at an elliptic major axis azimuth. The portion where a step forming layer 47 exists corresponds to the reflective display portion. The elliptic azimuth is continuously changed between the plane closer to the second alignment layer 34 of the liquid crystal layer and the plane closer to the first alignment layer 33, and the liquid crystal layer 10 is twistedly aligned.

For stabilizing the twisted alignment, it is possible to mingle a chiral agent into the liquid crystal layer 10. At this time, also for stabilizing the other homogeneous alignment, the amount of the chiral agent to be mingled is 0.1 weight % or less. Though the reflective display portion is twistedly aligned, the twist angle is as small as 45 degrees. Hence, its optical anisotropy is not greatly different from that of the homogeneous alignment (whose twist angle is 0).

Focusing attention to the liquid crystal layer boundary closer to the first alignment layer 33 in the reflective display portion, the light (linearly polarized light) passes through the first polarizer 41 is entered into the liquid crystal layer 10 so that the electric vector of the light may form an angle of 45 degrees with the alignment direction of the liquid crystal layer. This holds true to the first embodiment. The effect caused by the optical anisotropy of the liquid crystal layer is realized. As a result, the light is transformed into the polarized state closer to the linearly polarized light whose electric vector is in parallel to the absorption axis of the first polarizer 41. Hence, the dark image can be obtained when no voltage is applied.

Figure 8:
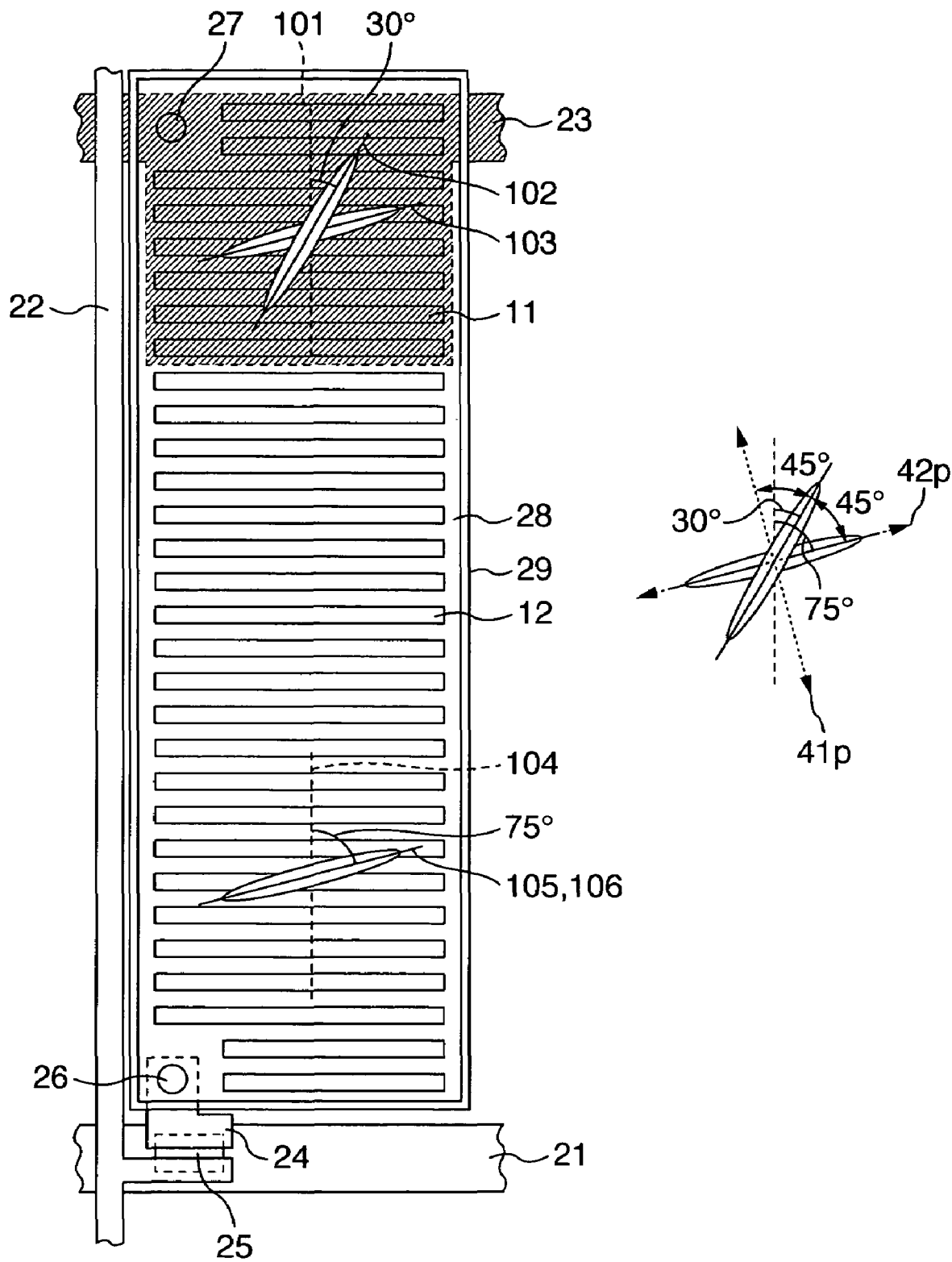
FIG. 8 is a view showing various lines, an electrode distribution and an alignment direction on one pixel located on the second embodiment of the liquid crystal display apparatus according to the second embodiment of the present invention.

Also in this case, the alignment direction of the reflective display portion has two alignment directions, each of which forms an angle of 45 degrees with the alignment direction of the transmissive display portion, as shown in FIGS. 6 and 8. In any alignment direction, on the plane closer to the second substrate, the alignment direction of the reflective display portion is the same as that of the transmissive display portion, while on the plane closer to the first substrate, the alignment direction of the reflective display portion is shifted by 45 degrees with respect to that of the transmissive display portion. Based on the alignment direction of the transmissive display portion, in the direction shown in FIG. 6, the former is shifted clockwise by 45 degrees with respect to the latter, while in the direction shown in FIG. 8, the former is shifted counterclockwise by 45 degrees with respect to the latter.

When a voltage is applied, the electric field is mainly distributed on the side closer to the second substrate 32 on which the pixel electrode 28 and the common electrode 29 are located. On the plane closer to the second substrate 32, the alignment direction of each electrode is the same as that of the transmissive display portion. Hence, in the two alignment directions shown in FIGS. 6 and 8, the effective difference of the dielectric anisotropy therebetween is small and the difference of the threshold voltage in the reflective display portion is also small. Hence, the effect of reducing the manufacturing process may be obtained as keeping the substantially same reflective display characteristic as that of the first embodiment.

Third Embodiment

Figure 9:
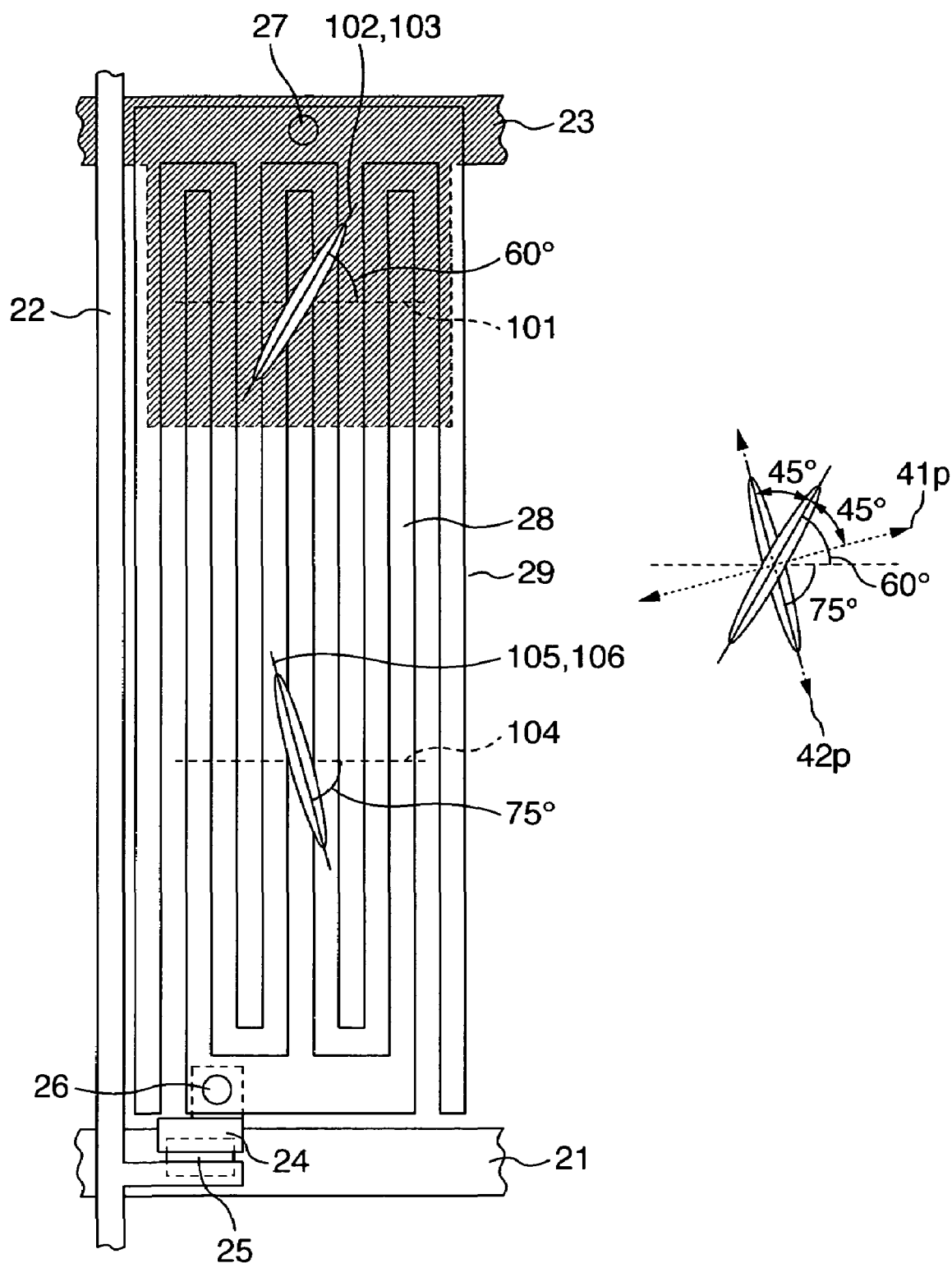
FIG. 9 is a view showing various lines, an electrode distribution and an alignment direction on one pixel located on a second substrate of a liquid crystal display apparatus according to a third embodiment of the present invention.

The top view of the LCD apparatus according to this embodiment is shown in FIG. 9. In this embodiment, each of the pixel electrode 28 and the common electrode 29 is formed in a combshaped manner and both of the electrodes are formed in the same layer. This makes it possible to form the arched electric field between the pixel electrode 28 and the common electrode 29 when a voltage is applied, thereby causing the electric field to drive the liquid crystal layer.

The combshaped structure of each electrode 28 or 29 is formed in parallel to the signal electrode 22 in any of the reflective display portion and the transmissive display portion. Hence, the electric field direction 101 of the reflective display portion and the electric field direction 104 of the transmissive display portion are vertical to the signal electrode 22. In association with this direction, the alignment directions of the reflective display portion and the transmissive display portion were set as shown in FIG. 9.

The alignment direction 102 of the first alignment layer 33 and the alignment direction 103 of the second alignment layer 34 in the reflective display portion are rotated counterclockwise 90 degrees in comparison with those shown in FIG. 1. In the transmissive display portion, the directions are rotated clockwise 90 degrees in comparison with those shown in FIG. 1.

In association with these locations, the transmissive axes of the first and the second polarizers 41 and 42 are changed. This change allows this third embodiment to have the same composition as the transmissive IPS system. That is, the transmissive axis 41p of the first polarizer 41 is perpendicular to the transmissive axis 42p of the second polarizer 42. The latter is located in parallel to the liquid crystal alignment direction in the transmissive display portion.

Further, in the reflective display portion, it is preferable to make the retardation of the liquid crystal layer a quarter wave and cross its alignment direction with the transmissive axis 41p of the first polarizer 41 at an angle of 45 degrees. Actually, it is practical to keep the angle in the range of 40 to 50 degrees by considering an error ±10% on the manufacture. Hence, like the first embodiment, in the reflective display portion, the lamination of the liquid crystal layer 10 and the first polarizer 41 is made to be a circularly polarized light plate. This results in being able to obtain the dark image on the reflective display when a voltage is applied like the transmissive display.

For this embodiment, it is possible to realize both of the reflective display in a bright place and the transmissive display of a wide viewing angle being comparable to the transmissive LCD apparatus. Further, the formation of the pixel electrode 28 and the common electrode 29 in the same layer results in being able to simplify the manufacturing process.

Figure 25:
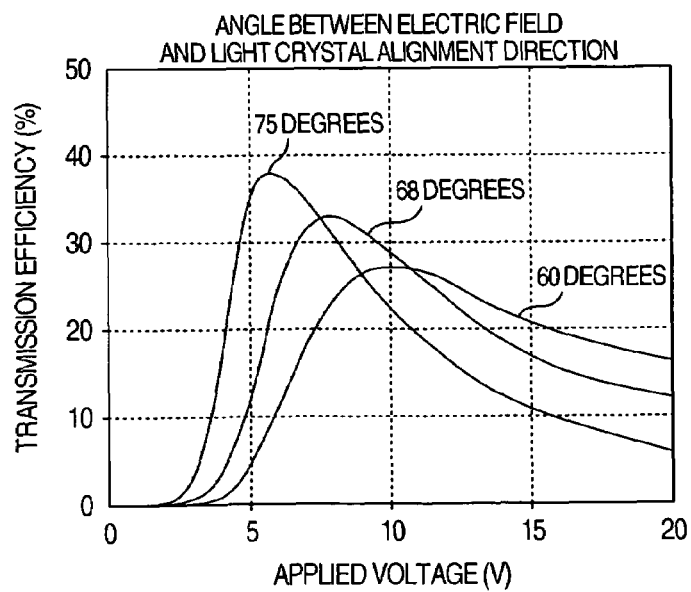
FIG. 25 is a graph showing change of an applied voltage to transmittance characteristic of the IPS liquid crystal display apparatus with change of an angle formed between an electric field direction and a liquid crystal alignment direction.

In the meantime, the angle formed between the electric field direction and the liquid crystal alignment direction has a significant influence upon the display characteristic. The result of measuring dependency of a permittivity upon an applied voltage with respect to the transmissive IPS LCD apparatus with a different angle formed between the electric field direction and the liquid crystal alignment direction is shown in FIG. 25. As shown, remarking the threshold voltage at which the liquid crystal layer starts to change its alignment, as the angle formed between the electric field direction and the liquid crystal alignment direction is increased to 60, 68 and 75 degrees, the threshold voltage is made lower. As the angle formed between the electric field direction and the liquid crystal alignment direction comes closer to 90 degrees, the threshold voltage is likely to be lower. This results from the fact that the angle formed between the electric field direction and the liquid crystal alignment direction comes closer to 90 degrees, the effective dielectric anisotropy of the liquid crystal layer is made larger. Further, the voltage at which the transmission efficiency becomes maximum is also likely to be lower as the angle formed between the electric field direction and the liquid crystal alignment direction comes closer to 90 degrees. This improves the maximum value of the transmission efficiency. As described above, the transmissive display characteristic is generally likely to be improved as the angle formed between the electric field direction and the liquid crystal alignment direction comes closer to 90 degrees.

Moreover, in general, two or more ways of changing the alignment of the liquid crystal layer when a voltage is applied are provided. The transmissive IPS LCD apparatus provides clockwise and counter clockwise rotations. As the angle formed between the electric field direction and the liquid crystal alignment direction comes closer to 90 degrees, the clockwise rotation is likely to occur as easily as the counterclockwise rotation. Hence, the alignment state of the liquid crystal appearing when a voltage is applied is not kept constant, so that the display is made uneven. For making the display even at a low threshold voltage, the angle formed between the electric field direction and the liquid crystal alignment direction is often set in the range of 80 to 60 degrees.

In the first embodiment, the angle formed between the electric field direction and the liquid crystal alignment direction becomes 75 degrees in the transmissive display portion. Further, for making the reflective display portion the dark image and the reflective display and the transmissive display the dark image when no voltage is applied, the liquid crystal alignment direction in the reflective display portion is set to be crossed with the transmissive display portion at an angle of 45 degrees. As a result, in the reflective display portion, the angle formed between the electric field direction and the liquid crystal alignment direction becomes 60 degrees. The threshold voltage depends upon the angle formed between the electric field direction and the liquid crystal alignment direction as shown in FIG. 25. Hence, if the angle formed between the electric field direction and the liquid crystal alignment direction in the reflective display portion is different from the angle in the transmissive display portion, the threshold value of the reflective display portion is made different from the threshold value of the transmissive display portion.

Fourth Embodiment

Figure 10:
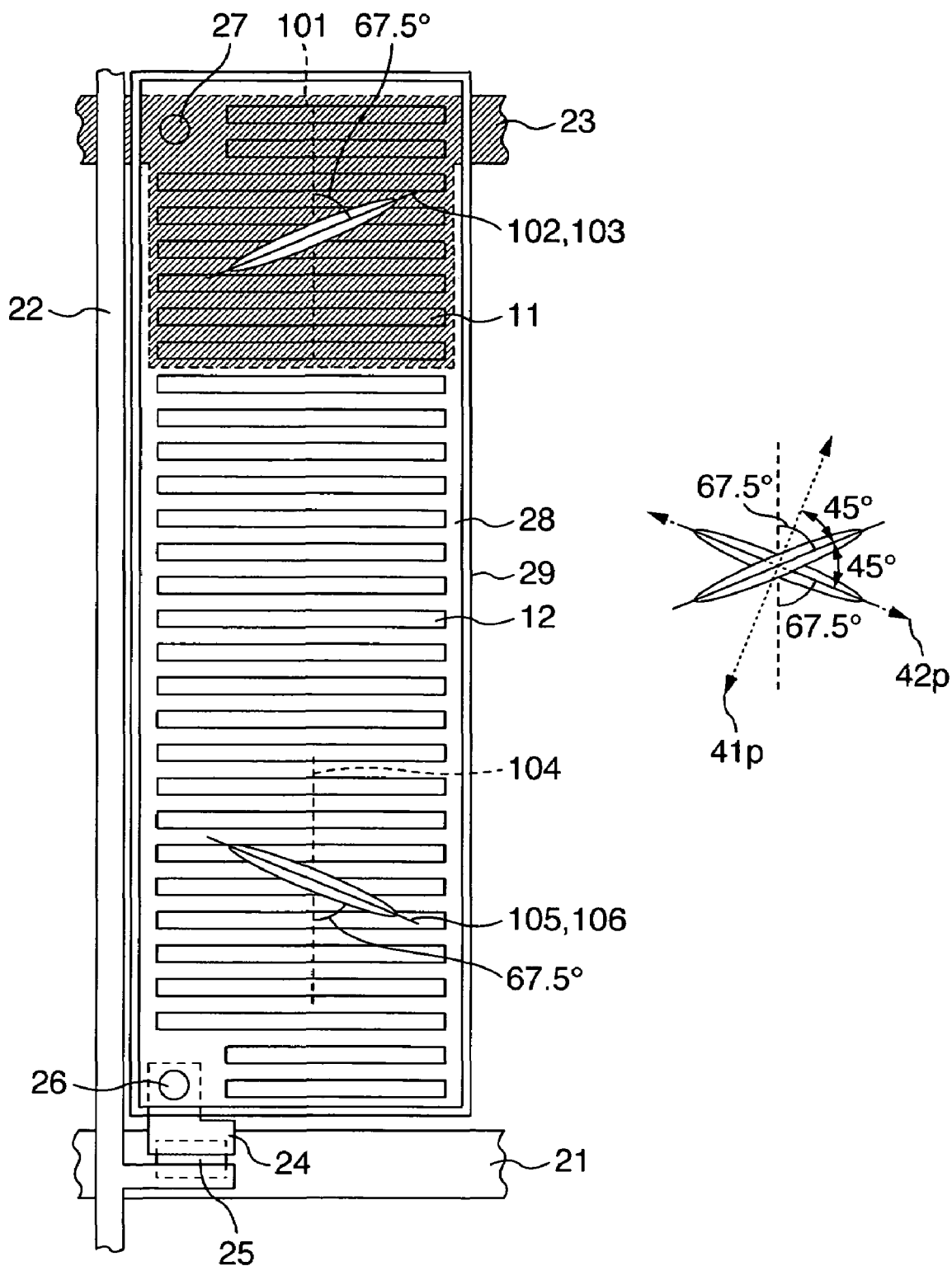
FIG. 10 is a view showing various lines, an electrode distribution and an alignment direction on one pixel located on a second substrate of a liquid crystal display apparatus according to a fourth embodiment of the present invention.

The alignment direction and the liquid crystal alignment state in the reflective display portion and the transmissive display portion of the LCD apparatus according to this embodiment is shown in FIG. 10. In this embodiment, in the transmissive display portion, an angle formed between the electric field direction and the liquid crystal alignment direction is set as 67.5 degrees. At this time, when the liquid crystal alignment direction of the reflective display portion is determined so that the direction may be shifted by 45 degrees with respect to the transmissive display portion, also in the reflective display portion, the angle formed between the electric field direction and the liquid crystal alignment direction is set as an angle of 67.5 degrees.

The electrode structure of the first embodiment is the simplest in the respect that the stripe direction is the same on one overall pixel. Hence, the pixel is designed and manufactured more easily. Further, it is advantageous in that the invalid area that does not contribute to the display is unlikely to occur on one pixel. This fourth embodiment may be composed to have the same electrode structure as that of the first embodiment and make the angle formed between the electric field direction and the liquid crystal alignment direction in the reflective display portion the same as the angle formed therebetween in the transmissive display portion. This composition offers the effect that the threshold voltage of the reflective display is the same as that of the transmissive display and the tone characteristic of the reflective display is more closer to that of the transmissive display.

Fifth Embodiment

Figure 11:
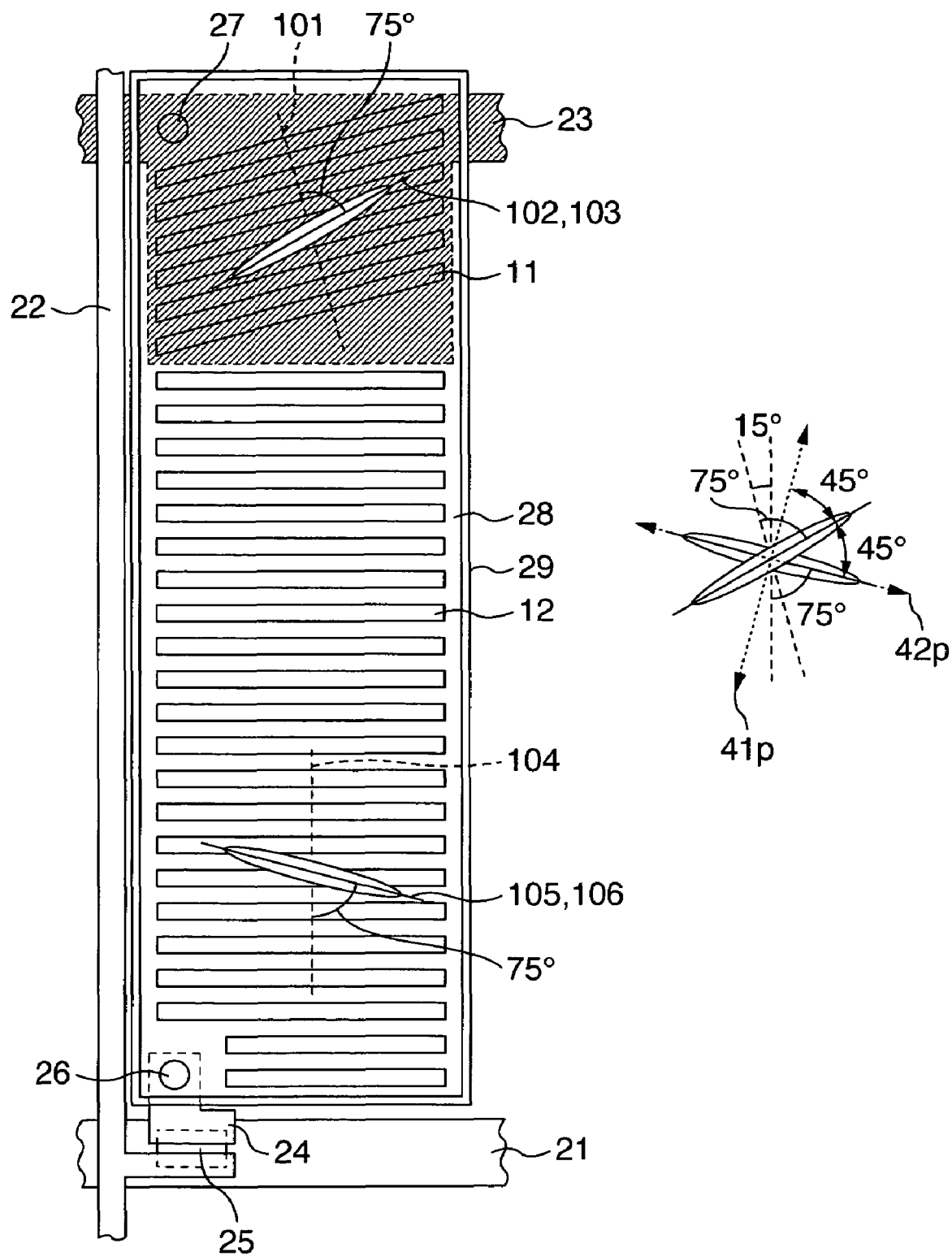
FIG. 11 is a view showing various lines, an electrode distribution and an alignment direction on one pixel located on a second substrate of a liquid crystal display apparatus according to a fifth embodiment of the present invention.

In this embodiment, the threshold voltage of the reflective display is made the same as that of the transmissive display by changing the pixel structure. The pixel structure of this embodiment is shown in FIG. 11. The stripped structure 12 of the transmissive display portion is in parallel to the scanning line 21, while the stripped structure 11 of the reflective display portion is inclined by 15 degrees with respect to the scanning line 21.

In the transmissive display portion, the angle formed between the electric field direction 104 and the alignment directions 105 and 106 is set as an angle of 75 degrees and the alignment directions 102 and 103 of the reflective display portion is determined to form an angle of 45 degrees with respect to the transmissive display portion. These locations allow the angle formed between the electric field direction and the liquid crystal alignment direction to be 75 degrees also in the reflective display portion.

For keeping an even display at a low threshold voltage more excellently, for example, for the transmissive IPS LCD apparatus, an angle formed between the electric field direction and the liquid crystal alignment direction is often set as 75 degrees. When the angle formed between the electric field direction and the liquid crystal alignment direction comes closer to 90 degrees for lowering the threshold voltage, the critical angle at which the sufficient even alignment can be obtained is about 75 degrees.

In this embodiment, the stripped structure 11 of the reflective display portion is located to be crossed with the stripped structure 12 of the transmissive display portion at an angle of 15 degrees. This location allowed the threshold voltage of the reflective display to be equal to that of the transmissive display and the angle formed between the electric field direction and the liquid crystal alignment direction in each of the displays to be 75 degrees. This makes it possible to make the threshold voltages of the reflective display and the transmissive display equal to each other and to lower the driving voltage at a time.

Sixth Embodiment

In the fifth embodiment, the stripped structure of the transmissive display portion is located in parallel to the scanning line, while the striped structure of the reflective display portion is inclined by 15 degrees with respect to the scanning line. Hence, an invalid area where an electric field is not sufficiently applied takes place in two corners of the substantially rectangular reflective display portion, which invalid area serves to lower a substantial numerical aperture.

Figure 12:
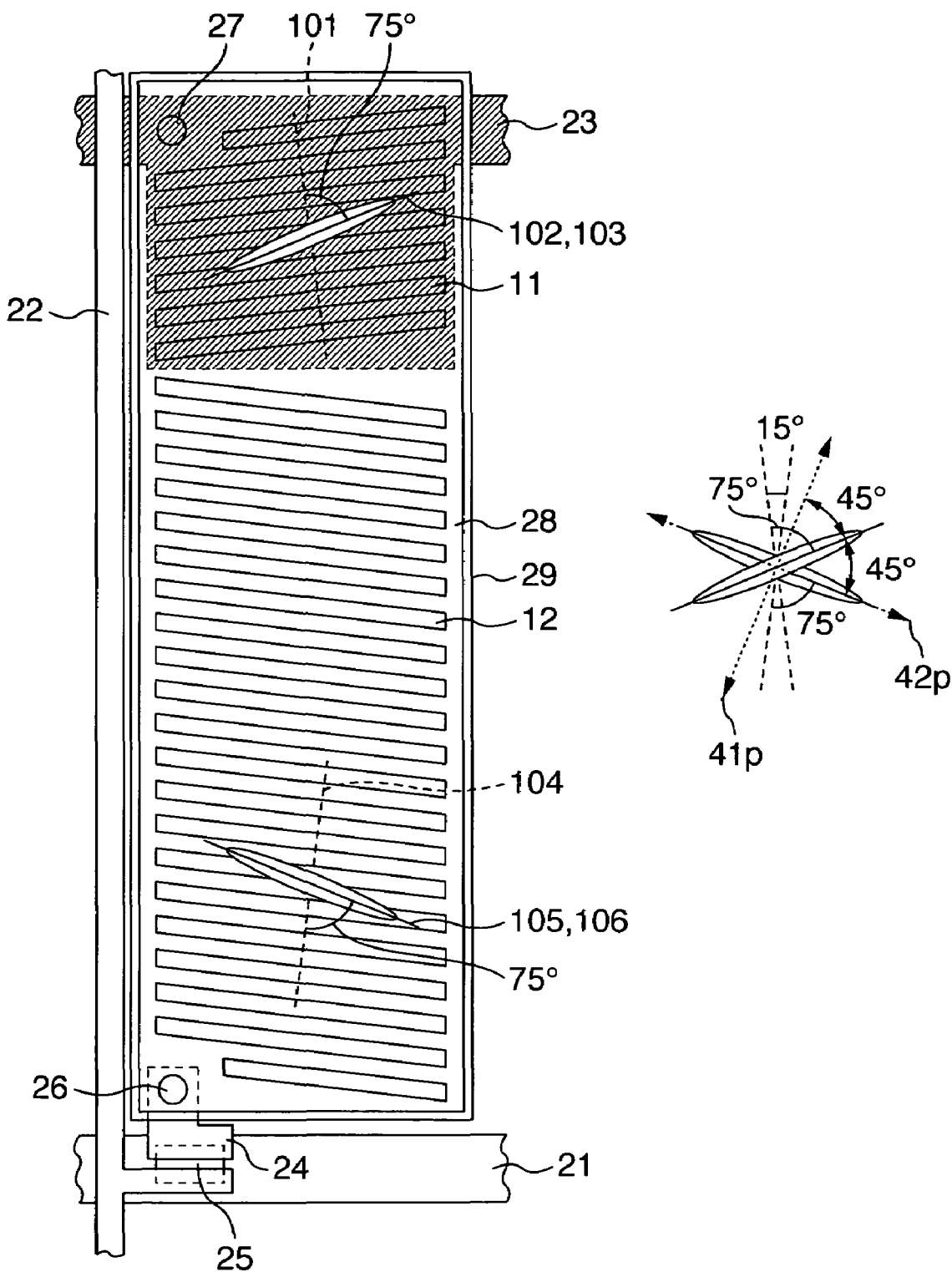
FIG. 12 is a view showing various lines, an electrode distribution and an alignment direction on one pixel located on a second substrate of a liquid crystal display apparatus according to a sixth embodiment of the present invention.

The pixel structure of the LCD apparatus according to this sixth embodiment is illustrated in FIG. 12. This embodiment was attempted to make the threshold voltage of the reflective display equal to that of the transmissive display and reduce the invalid area as lowering the driving voltage.

The striped structures 12 and 11 of the transmissive display portion and the reflective display portion are inclined by 7.5 degrees with respect to the scanning line 21. However, the inclinations of those structures 12 and 11 are opposite to each other. Moreover, the alignment directions 102 and 103 of the reflective display portion and the alignment directions 105 and 106 of the transmissive display portion are also illustrated in FIG. 12. These hold true to the alignment directions of the fourth embodiment shown in FIG. 10. In this embodiment, however, the stripped structures 12 and 11 of the transmissive display portion and the reflective display portion are inclined by 7.5 degrees with respect to the scanning line 21. Hence, the angle formed between the electric field direction and the liquid crystal alignment direction is 75 degrees in the reflective display portion as well as the transmissive display portion.

In the fifth embodiment, the inclination of the striped structure results in bringing about the invalid area. In this sixth embodiment, however, since the inclination is as small as 7.5 degrees, the invalid area is reduced accordingly. Further, this embodiment is arranged to reduce the invalid area as obtaining the two effects, that is, keeping the threshold voltages of the reflective display and the transmissive display equal to each other and lowering the driving voltage. This arrangement results in increasing the reflectance and the transmittance.

Seventh Embodiment

Figure 13:
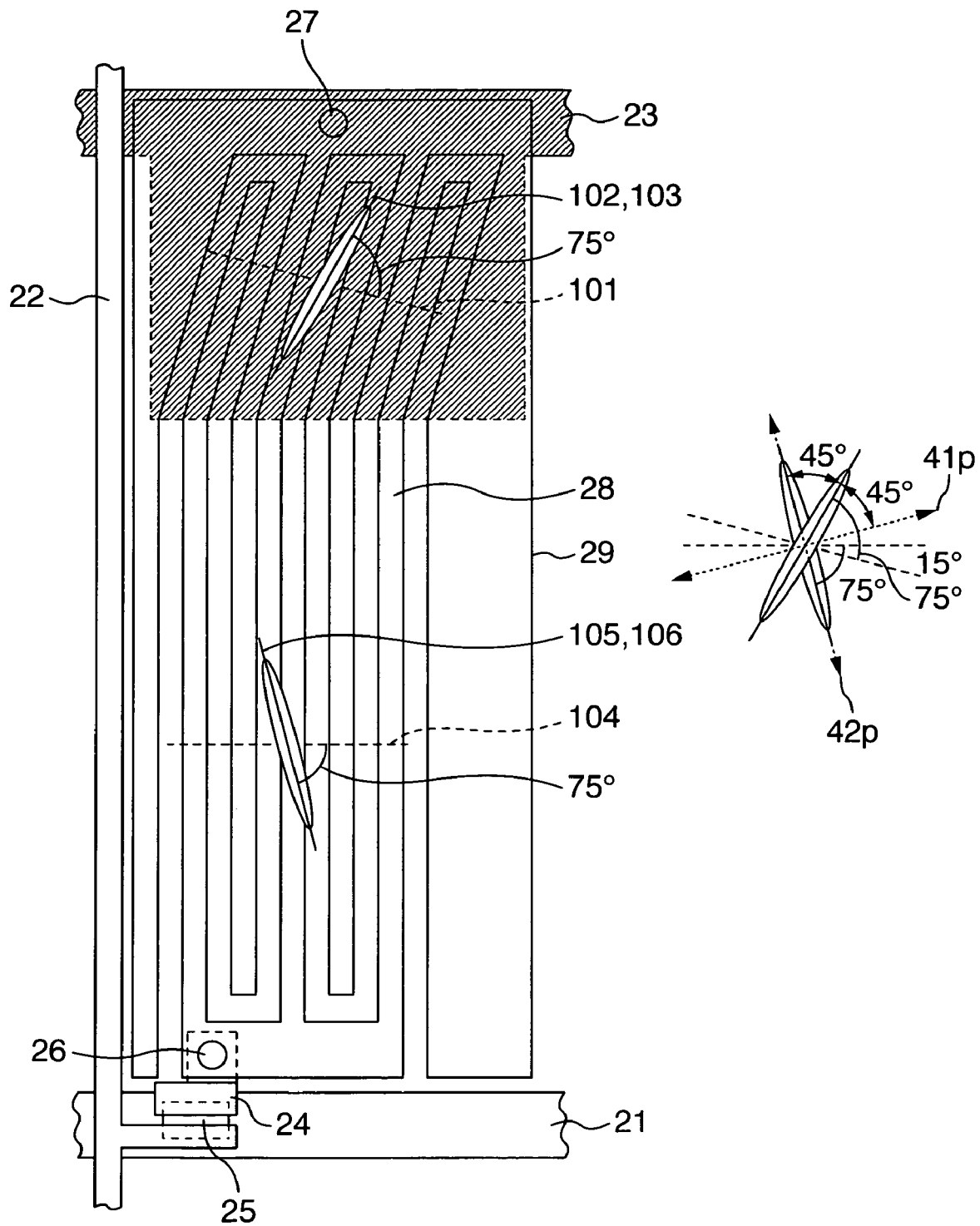
FIG. 13 is a view showing various lines, an electrode distribution and an alignment direction on one pixel located on a second substrate of a liquid crystal display apparatus according to a seventh embodiment of the present invention.

One example of a pixel structure of the LCD apparatus according to this embodiment is illustrated in FIG. 13. In this seventh embodiment, the pixel electrode 28 and the common electrode 29 are formed in the same layer, for the purpose of keeping the threshold voltages of the reflective display and the transmissive display equal to each other.

The pixel electrode 28 and the common electrode 29 are bent on the boundary between the reflective display portion and the transmissive display portion. In the transmissive display portion, those electrodes 28 and 29 are located in parallel to the signal line 22, while in the reflective display portion, those electrodes 28 and 29 are inclined by 15 degrees with respect to the signal line 22. Moreover, the alignment directions 102 and 103 in the reflective display portion and the alignment directions 105 and 106 in the transmissive display portion are also illustrated in FIG. 13. This is likewise to the alignment directions of the third embodiment shown in FIG. 9. In this seventh embodiment, the pixel electrode 28 and the common electrode 29 are inclined by 15 degrees in the reflective display portion. Hence, like the transmissive display portion, the angle formed between the alignment directions 102 and 103 and the electric field direction 101 in the reflective display portion is made to be 75 degrees.

Eighth Embodiment

Figure 14:
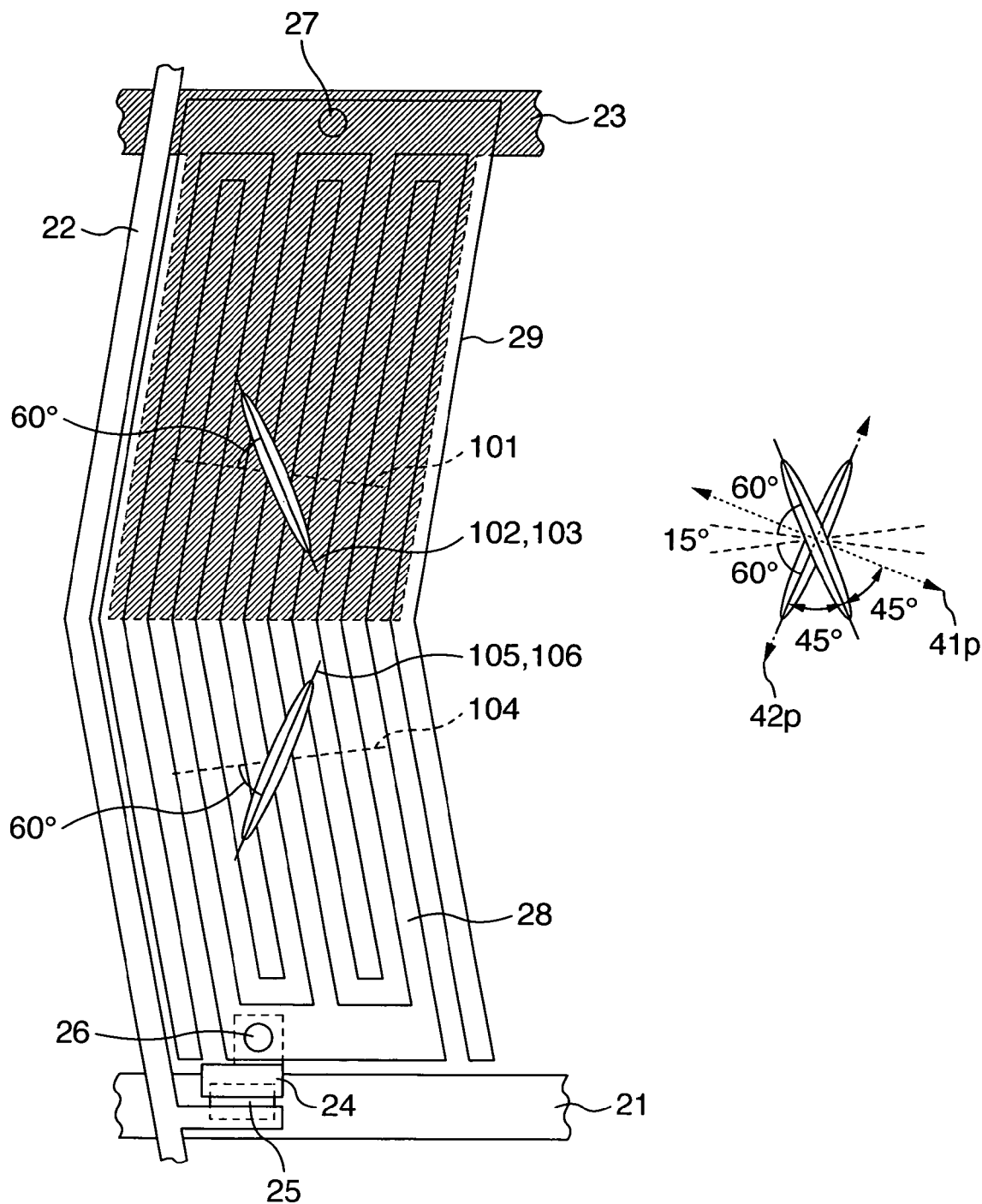
FIG. 14 is a view showing various lines, an electrode distribution and an alignment direction on one pixel located on a second substrate of a liquid crystal display apparatus according to an eighth embodiment of the present invention.

One example of a pixel structure of the LCD apparatus according to this embodiment is illustrated in FIG. 14. The pixel electrode 28 and the common electrode 29 are inclined at the upper and the lower ends of the pixel. The angles of inclination are both 7.5 degrees. Since the angles of inclination of the upper and the lower ends are equal to each other, the pixel electrode 28 and the common electrode 29 are bent on the center of the pixel. The angle of bent is 15 degrees. Like the pixel electrode 28 and the common electrode 29, the signal line 22 is also bent by 15 degrees on the center of the pixel. The pixel is divided on the boundary of the central bent portion. One half side of the pixel is the reflective display portion, while the other half side of the pixel is the transmissive display portion. Hence, the area ratio between the reflective display portion and the transmissive display portion is 1:1.

The reflective display portion and the transmissive display portion are located so that those liquid crystal alignment directions may be shifted by 45 degrees with respect to each other and the directions of the combshaped electrodes are shifted by 15 degrees with respect to each other. This location allows the angle formed between the electric field applying direction and the liquid crystal alignment direction to be 60 degrees in both of the reflective display portion and the transmissive display portion. Further, the signal line 22 is located in parallel to the pixel electrode 28 and the common electrode 29. Hence, on the overall area of the pixel, the electric field is substantially uniformly applied onto the liquid crystal layer, so that no invalid area may take place. This results in obtaining a more high-efficient display.

Ninth Embodiment

Figure 15:
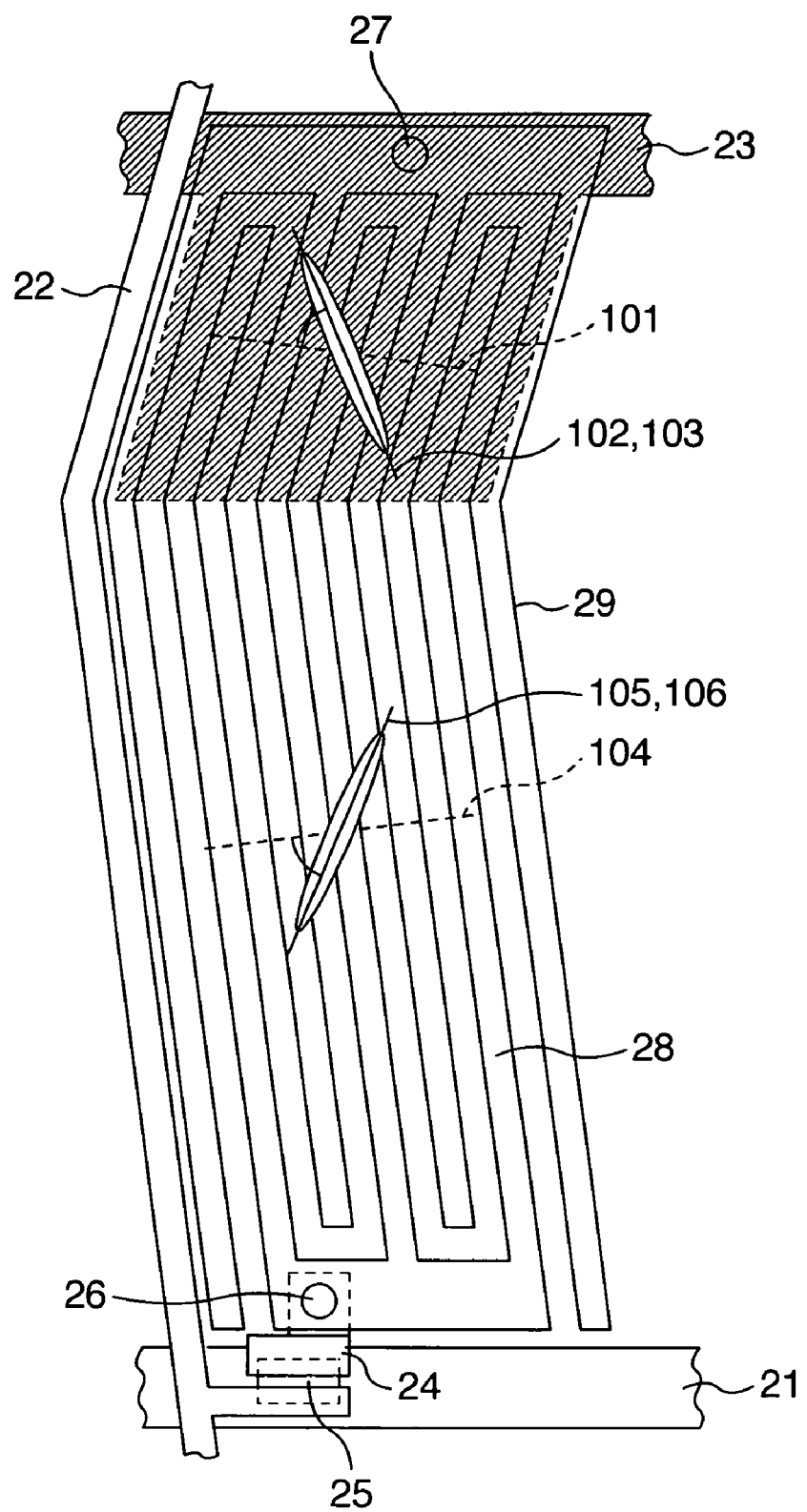
FIG. 15 is a view showing various lines, an electrode distribution and an alignment direction on one pixel located on a second substrate of a liquid crystal display apparatus according to a ninth embodiment of the present invention.

One example of the pixel structure of the LCD apparatus according to this embodiment is illustrated in FIG. 15. The pixel electrode 28 and the common electrode 29 are inclined at the upper and the lower ends of the pixel. The angle of inclination is larger at the upper end but smaller at the lower end. The difference of the angle of inclination between the upper end and the lower end causes the pixel electrode 28 and the common electrode 29 to be bent in the portion shifted from the center of the pixel so that the area ratio of the reflective display portion to the transmissive display portion may be set to any ratio except the ratio of 1:1. FIG. 15 shows the composition in which the transmissive display area has a larger area ratio.

Tenth Embodiment

In the transmissive IPS LCD apparatus, the alignment change of the liquid crystal layer caused when a voltage is applied is approximated by a one-axial alignment model. That is, the liquid crystal layer substantially keeps the homogeneous alignment when a voltage is applied and only the alignment direction is rotated inside the layer. In this case, the bright image may be colored in some viewing angles. For lessening this coloring, two areas whose alignment directions appearing when a voltage is applied are located within one pixel. By offsetting the coloring appearing in the two areas with each other on one pixel, it is possible to obtain a substantially non-colored display at any viewing angle.

In the LCD apparatus according to the present invention, the same problem takes place. That is, the bright image is colored in the transmissive display portion. In this tenth embodiment, by applying the pixel designed to locate the two alignment areas on one pixel, the elimination of the coloring of the bright image was attempted.

Figure 16:
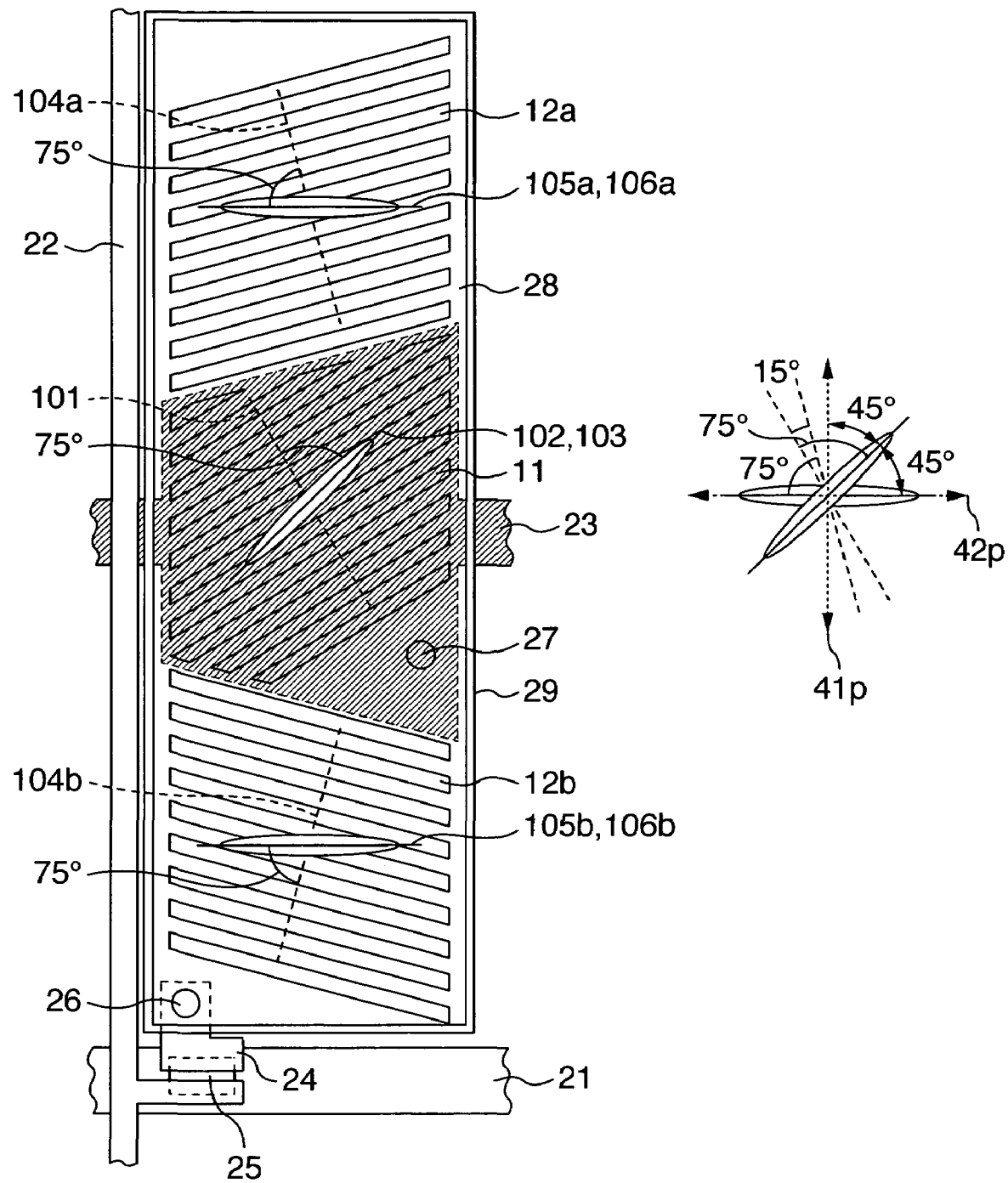
FIG. 16 is a view showing various lines, an electrode distribution and an alignment direction on one pixel located on a second substrate of a liquid crystal display apparatus according to a tenth embodiment of the present invention.

One example of the pixel structure of the LCD apparatus according to this tenth embodiment is illustrated in FIG. 16. The common line 23 is shifted to the center of the pixel and the reflective display portion is located on the center of the pixel so that the reflective display portion may be laid between the transmissive display portions. The direction of the slit structure 12a of the upper transmissive display portion was located in opposition to that of the slit structure 12b of the lower transmissive display portion.

The slit structures 12a and 12b of the upper and the lower transmissive display portions are inclined by 15 degrees with respect to the scanning line 21. However, the directions of inclination of the upper and the lower display portions are different from each other. In the upper transmissive display portion, the alignment direction 105a of the first alignment layer is in anti-parallel to the alignment direction 106a of the second alignment layer, and both of the alignment directions 105a and 106a are located in parallel to the scanning line 21. In the lower transmissive display portion, the alignment direction 105b of the first alignment layer is in anti-parallel to the alignment direction 106b of the second alignment layer, and the alignment directions 105b and 106b are located in parallel to the scanning line 21.

Those locations allow the liquid crystal layers both in the upper and the lower transmissive display portions to be aligned homogeneously in parallel to the scanning line 21. The slit structure 11 of the reflective display portion is inclined by 30 degrees with respect to the scanning line 21. Further, the alignment direction 102 of the first alignment layer is located in anti-parallel to the alignment direction 103 of the second alignment layer and the alignment directions 102 and 103 are inclined by 45 degrees with respect to the scanning line 21.

Eleventh Embodiment

Figure 17:
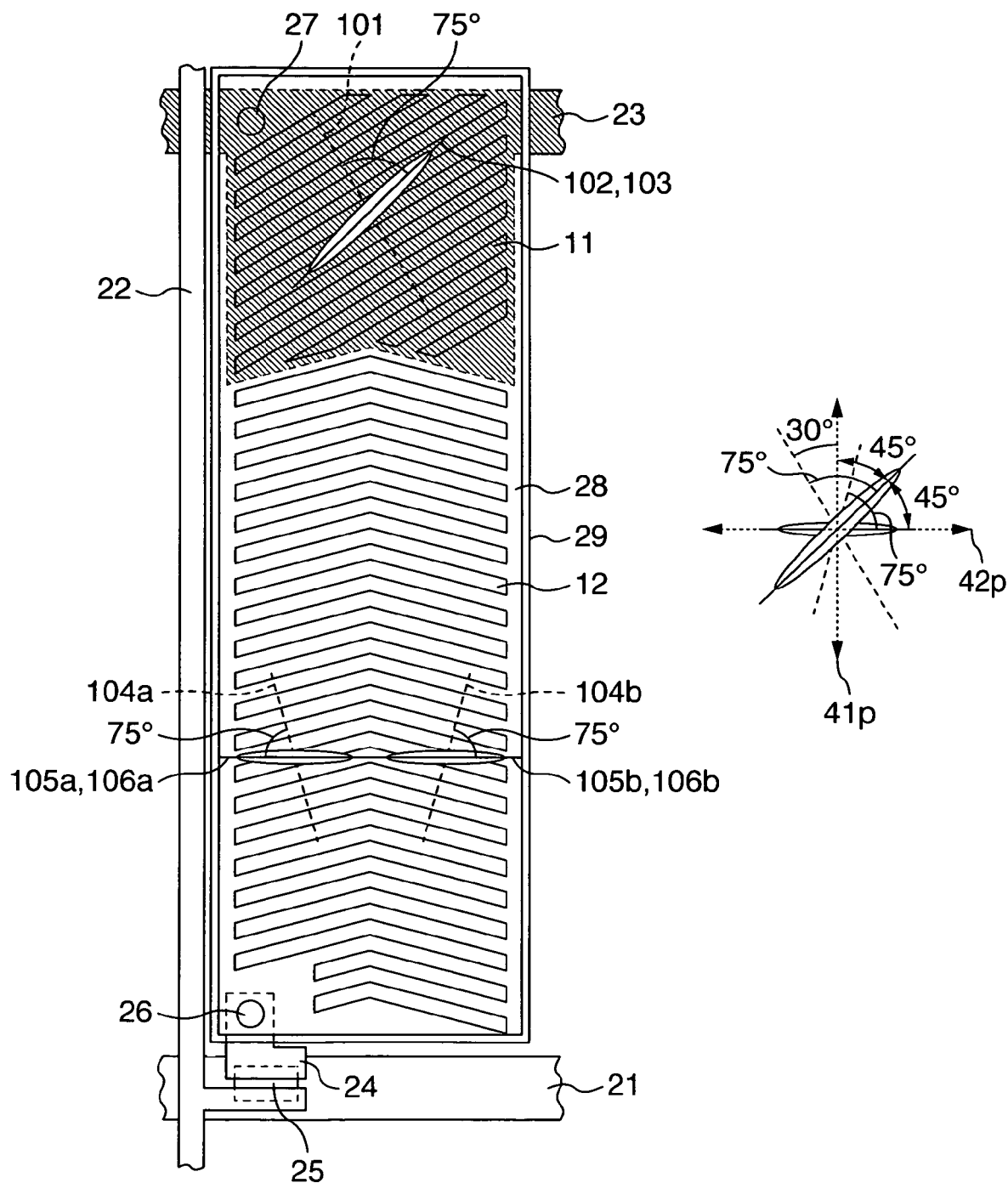
FIG. 17 is a view showing various lines, an electrode distribution and an alignment direction on one pixel located on a second substrate of a liquid crystal display apparatus according to an eleventh embodiment of the present invention.

One example of the pixel structure of the LCD apparatus according to this embodiment is illustrated in FIG. 17. Like the first embodiment, the reflective display portion is located at the upper end of the pixel. Unlike the first embodiment, the slit 12 of the transmissive display portion is bent on its center. The transmissive display portion is separated into the right and the left areas on the boundary of the bent portion, in which areas the alignment directions of the liquid crystal layers caused when a voltage is applied are different from each other. In the right and the left areas separated on the boundary of the bent portion, the slit structure 12 of the transmissive display portion is inclined by 15 degrees. However, the direction of the inclination in the right area is different from that in the left area.

In the left transmissive display portion, the alignment direction 105a of the first alignment layer is in anti-parallel to the alignment direction 106a of the second alignment layer but both of the directions 105a and 106a are located in parallel to the scanning line 21. In the right transmissive display portion, the alignment direction 105b of the first alignment layer is located in anti-parallel to the alignment direction 106b of the second alignment layer but both of the alignment directions 105b and 106b are located in parallel to the scanning line 21.

These locations allowed the liquid crystal layers provided in both of the right and the left transmissive display portions to be homogeneously aligned in parallel to the scanning line 21. The slit structure 11 of the reflective display portion was inclined by 30 degrees with respect to the scanning line 21. The alignment direction 102 of the first alignment layer was located in anti-parallel to the alignment direction 103 of the second alignment layer but both of the alignment directions 102 and 103 were inclined by 45 degrees with respect to the scanning line 21.

In the structures shown in FIGS. 16 and 17, the foregoing locations allowed the liquid crystal alignment direction of the transmissive display portion to be crossed with that of the reflective display portion at an angle of 45 degrees and the liquid crystal alignment directions to be crossed with the electric field directions at an angle of 75 degrees in each of the reflective display portion and the two transmissive display portions. This makes it possible to eliminate the coloring of the transmissive display in addition to keeping the threshold voltage of the reflective display and the transmissive display equal to each other and lowering the driving voltage.

Twelfth Embodiment

In the tenth embodiment, the two areas whose alignment directions occurring when a voltage is applied are different from each other were located in the transmissive display portion, for reducing the coloring of the bright image. In this twelfth embodiment, in addition to the foregoing composition of the tenth embodiment, the alignment was executed so that the alignment direction of the second alignment layer 34 was made equal to the alignment direction of the first alignment layer 33 in the transmissive display portion and the alignment was executed on the overall surface in one direction.

Figure 18:
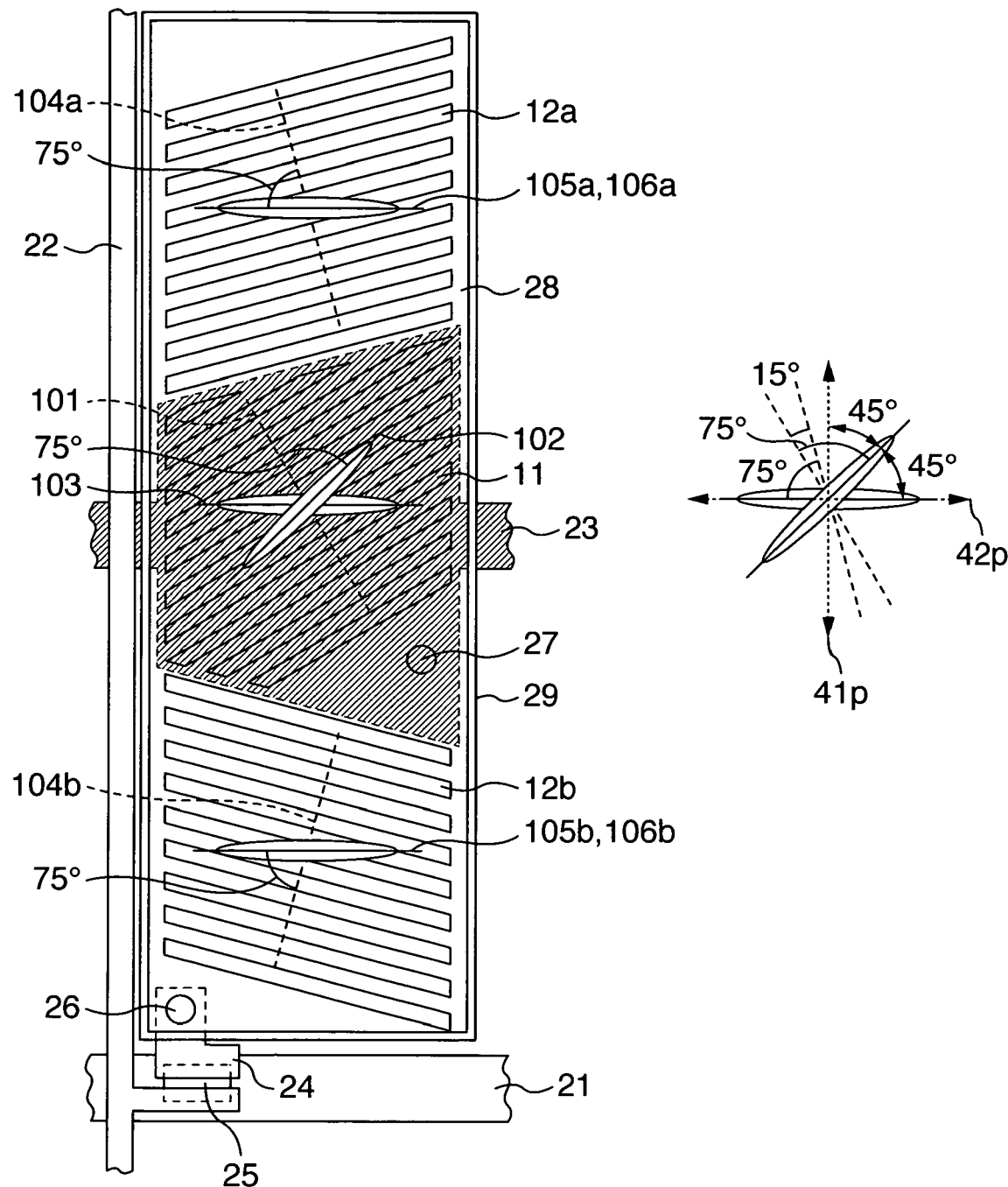
FIG. 18 is a view showing various lines, an electrode distribution and an alignment direction on one pixel located on a second substrate of a liquid crystal display apparatus according to a twelfth embodiment of the present invention.

The pixel structure of the LCD apparatus according to this embodiment is illustrated in FIG. 18. The reflective display portion was located in the center of the pixel and the transmissive display portion was located in the upper and the lower of the reflective display portion. The direction of the slit structure 12a of the upper transmissive display portion was opposite to the direction of the slit structure 12b of the lower transmissive display portion. The slit structures 12a and 12b were inclined by 15 degrees with respect to the scanning line. However, the directions of inclinations of these slits are different from each other.

In the upper transmissive display portion, the alignment direction 105a of the first alignment layer was located in anti-parallel to the alignment direction 106a of the second alignment layer but both of the alignment directions 105a and 106a were located in parallel to the scanning line 21. In the lower transmissive display portion, the alignment direction 105b of the first alignment layer was located in anti-parallel to the alignment direction 106b of the second alignment layer but both of these alignment directions 105b and 106b were located in parallel to the scanning line 21. These locations allowed the liquid crystal layers of the upper and the lower transmissive display portions to be homogeneously aligned in parallel to the scanning line 21.

The slit structure 11 of the reflective display portion was inclined by 30 degrees with respect to the scanning line 21. The alignment direction 102 of the first alignment layer was crossed with the alignment direction 103 of the second alignment layer at an angle of 45 degrees. The alignment direction 102 was inclined by 45 degrees with respect to the scanning line 21 and the alignment direction 103 was located in parallel to the scanning line 21. In the reflective display portion and the upper and the lower transmissive display portion, the alignment directions of the second alignment layers are equal to each other. Hence, they were formed by one treatment. This composition allows the coloring of the transmissive display to be eliminated as reducing the manufacturing steps in number.

Thirteenth Embodiment

As described with respect to the first embodiment, in the reflective display portion, the lamination of the liquid crystal layer 10 and the first polarizer 41 is made to be a circular polarizer. When no voltage is applied, the incident light becomes circular polarized light when the light reaches the pixel electrode 28 or the common electrode 29. The light is reflected on the pixel electrode 28 or the common electrode 29 and then is entered into the first polarizer 41 again. At this time, the electric vector of the light is in parallel to the absorption axis of the first polarizer 41. It means that the light is linearly polarized. This light is substantially completely absorbed by the first polarizer 41.

The foregoing polarization is strictly realized only when the light has a wavelength of 550 nm at which a human's visual sensitivity becomes maximum. As the wavelength of the incident light is off 550 nm, the foregoing polarization is further from the realization. In particular, on both of the ends of a visible wavelength that is further shifted from 550 nm, the reflectance is increased and the red and the blue lights are not absorbed by the first polarizer 41 but are reflected on the plate 41. Hence, in some kinds of ambient light, the dark image may be visible as purple.

Figure 19A:
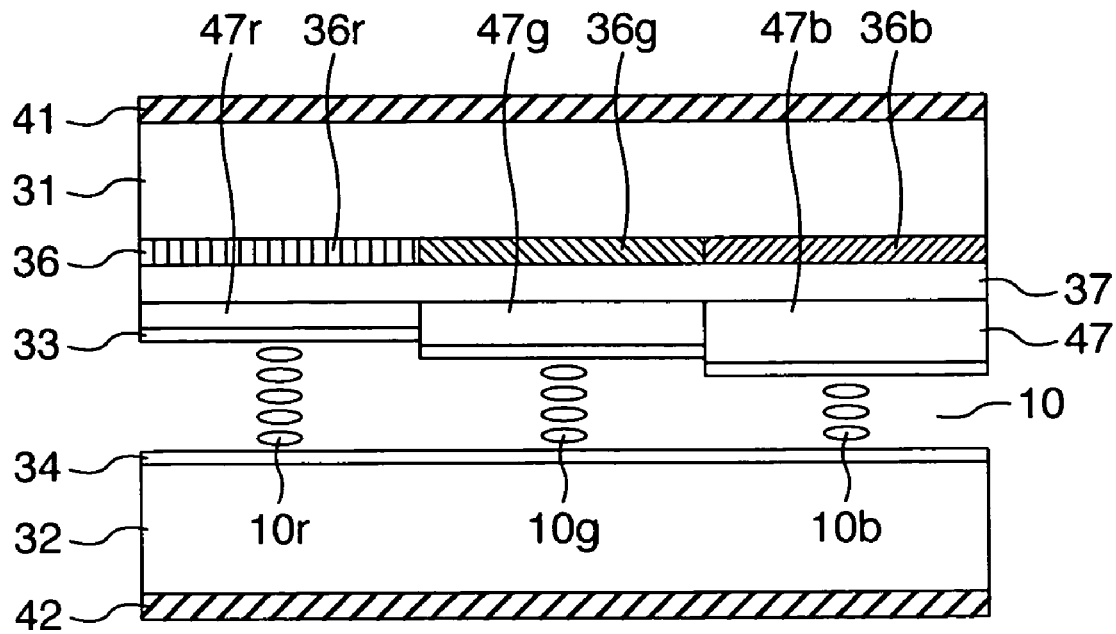
FIGS. 19A and 19B are views each showing relation between each color filter and a thickness of the corresponding liquid crystal layer in the liquid crystal display apparatus according to a thirteenth embodiment of the present invention.

The relation between each color filter and the thickness of the corresponding liquid crystal layer in the LCD apparatus of this embodiment is illustrated in FIG. 19A. FIG. 19A is a section showing the reflective display portions of three pixels closer to one another. This figure is intended to indicate the relation between each color filter and the thickness of the corresponding liquid crystal layer. Hence, the structure of the second substrate 32 is simplified in this figure.

In this embodiment, the thickness of the liquid crystal layer 10 was changed according to each color filter 36 so that the main transmissive wavelength of each color filter was made to be a quarter wavelength. For example, since the main transmissive wavelength in the corresponding liquid crystal layer 10g with the green color filter 36g is 550 nm, the liquid crystal was made to have the same thickness as that of the first embodiment. On the other hand, since the main transmissive wavelength in the corresponding liquid crystal layer 10r with the red color filter 36r is 650 nm, the liquid crystal was made to have a thickness of 650/550, that is, about 1.2 time as thick as that of the first embodiment. Further, since the main transmissive wavelength in the corresponding liquid crystal layer 10b with the blue color filter 36b is 450 nm, the liquid crystal was made to have a thickness of 450/550, that is, about 0.8 time as thick as that of the first embodiment.

Concretely, as shown in FIG. 19A, the foregoing different thicknesses were realized by changing the thickness of the step forming layer 47 according to each color filter 36. For the red color filter 36r, the step forming layer 47r is more thin, while for the blue color filter 36b, the layer 47b is more thick. On the plane of the second substrate 32 closer to the liquid crystal layer 10 is located the second alignment layer 34, the thickness of which is the same in the corresponding pixel with each color filter. Hence, the corresponding liquid crystal layer 10r with the red color filter 36r may be made more thick, while the corresponding liquid crystal layer 10b with the blue color filter 36b may be made more thin. Though this change of the thickness of the layer 47 leads to increasing the manufacturing steps, this change is advantageous in that the components of the resist material of the color filter 36 do not need to be rearranged.

Figure 19B:
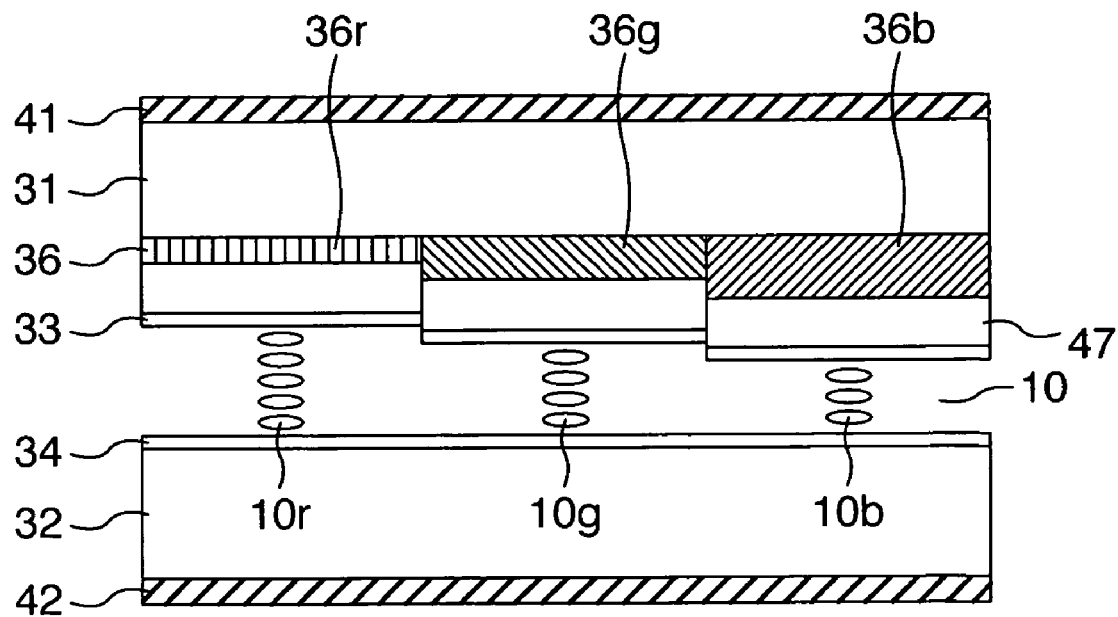

Moreover, as shown in FIG. 19B, it is possible to eliminate the leveling layer 37 shown in FIG. 19A and change the thickness of each color filter. That is, the thickness of the red color filter 36r is made more thin, while the thickness of the blue color filter 36b is made more thick. At a time, by making the optical density of the red color filter dense and that of the blue color filter thin, it is possible to keep the color well-balanced. Though the resist material of the color filter needs to be rearranged, this arrangement is advantageous in that the manufacturing steps are not increased.

In the main transmissive wavelength of each color filter, the ideal light polarization is realized. Hence, for the overall visible wavelength, the reflectance is reduced. It means that the non-colored dark image can be obtained at a low reflectance independently of the ambient light.

Fourteenth Embodiment

In the transmissive display portion, the light to be viewed by a user is passed through a color filter once, while in the reflective display portion, the light is passed therethrough twice. That is, in the transmissive display portion, the backlight is passed through a liquid crystal panel once, while in the reflective display portion, the ambient light is reflected on a reflective plate and thereby reciprocated within the liquid crystal panel.

According to the present invention, the pixel electrode 28 and the common electrode 29 are served as a reflective plate. In the reflective display portion, the light to be viewed by a user is absorbed by the color filter 36 twice. Hence, if the transmissive display portion uses the same color filter as the reflective display portion, the reflective display portion offers a higher color purity but a lower luminance than the transmissive display portion. Since a low reflectance disallows the user to recognize a vivid color though a higher color purity is realized, the reflective display portion is requested to have a color filter with a higher transmittance and a low color purity.

In order to realize this request, for example, it is considered that the color filter with a lower color purity is located in the reflective display portion and the color filter with a higher color purity is located in the transmissive display portion. Instead, it is also considered that the reflective display portion and the transmissive display portion has the color filters with the same color purity and the portion with no color filter is located in the reflective display portion. In this case, the additive process through the use of that portion and the portion where the color filter is provided is realized to lower the substantial color purity and increase the transmittance. In the latter case, the same resist may be used for the color filters located in the reflective display portion and the transmissive display portion. This is advantageous in that the latter case may be simply implemented with a small number of manufacturing steps.

This fourteenth embodiment uses the latter case for non-coloring the reflective dark image. Hereafter, the portion where no color filter is provided is called a hole portion because the portion looks like a hole in the color filter. Since the hole portion does not have no color filter, the liquid crystal layer is made thicker accordingly. Further, since the hole portion offers a higher transmittance, if the hole portion exists, the reflectance of the reflective display portion is mainly determined on the reflectance of the hole portion.

Figure 20A:
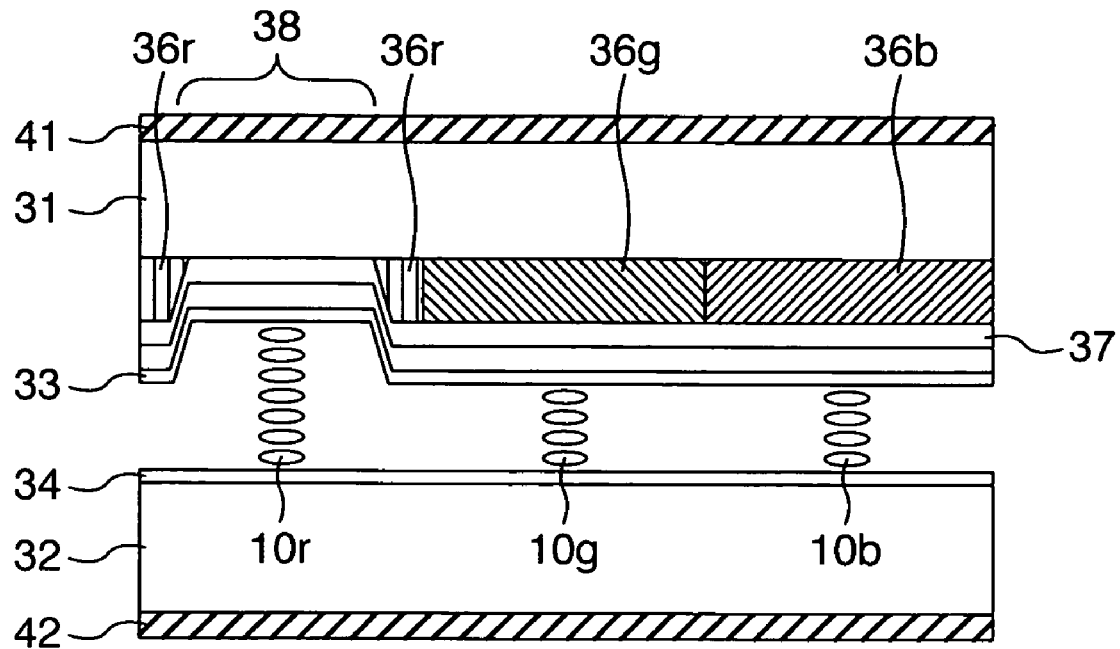
FIGS. 20A and 20B are views each showing relation between each color filter and a thickness of the corresponding liquid crystal layer in the liquid crystal display apparatus according to a fourteenth embodiment of the present invention.

The relation between each color filter and the thickness of the corresponding liquid crystal layer in the LCD apparatus of this embodiment is illustrated in FIG. 20A. This figure is a section of three pixels ranged in sequence in the reflective display portion and is intended for indicating the relation between each color filter and the thickness of the corresponding liquid crystal layer. Hence, the structure formed on the second substrate 32 is simplified in the illustration.

For example, a hole portion 38 is located in a red color filter 36r. In this case, the thickness of the liquid crystal layer in the red color filter 36r is made substantially thicker than those of a green color filter 36g and a blue color filter 36b that allow a ray of light with a shorter wavelength to pass through those green and blue color filters 36g and 36b. Hence, as compared with the case that the thickness of the liquid crystal layer is the same in respective color filters, in this case, each color filter obtains the corresponding thickness of the liquid crystal layer with a red wavelength. This thus makes it possible to lower the reflectance of the dark image on a longer wavelength.

Figure 20B:
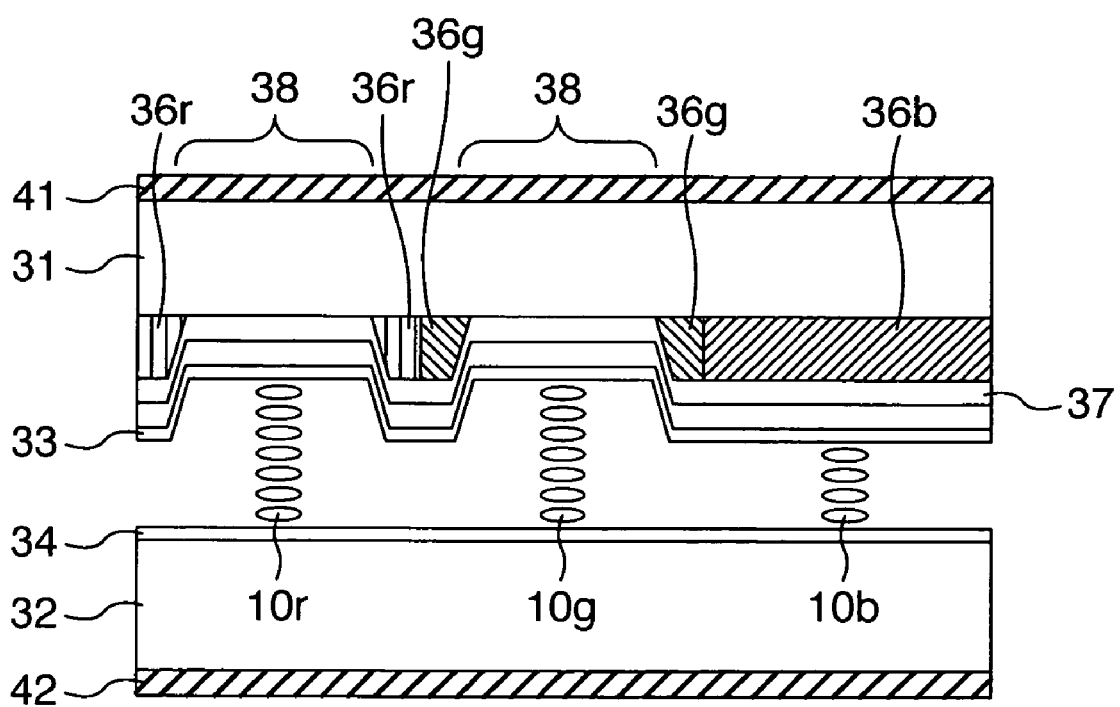

Instead, as shown in FIG. 20B, the hole portion 38 is located in each of the red and the green color filters 36r and 36g. In this case, the thickness of the liquid crystal layer 10b in the blue color filter 36b is made substantially thinner than the red and the green color filters 36r and 36g that allow a ray of light with a longer wavelength to pass through those color red and green filters. Hence, as compared with the case that the thickness of the liquid crystal layer is the same in respective color filters, in this case, each color filter obtains the corresponding thickness of the liquid crystal layer with the blue wavelength. This thus makes it possible to reduce the reflectance of the dark image on a shorter wavelength side.

As set forth above, by a simple way of locating the hole portion in the red or the green and blue color filters, it is possible to offer the effects of lowering the reflectance of the dark image, non-coloring the reflective dark image, improving the reflectance of the reflective display, and making the color purities of the reflective display and the transmissive display uniform.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display apparatus comprising:
   a first substrate;
   a second substrate;
   a liquid crystal layer laid between said first and second substrates;
   said second substrate having a pixel electrode and a common electrode so that an electric field may be applied between said pixel electrode and said common electrode in substantially parallel to said substrate surface, for driving said liquid crystal layer;
   one pixel having a reflective display portion and a transmissive display portion;
   a first polarizer and a second polarizer located outsides of said first and second substrates;
   an alignment layer imparting to the liquid crystal layer a first liquid crystal alignment direction in said transmissive display portion and a second liquid crystal alignment direction in said reflective display portion; and
   said first and second polarizers having their transmissive axes crossed at right angles with each other, and wherein the first liquid crystal alignment direction in said transmissive display portion is in parallel to any one of said transmissive axes of said first and second polarizers and the second liquid crystal alignment direction in said reflective display portion is crossed with said transmissive axes of said first and second polarizers at an angle of 40 to 50 degrees.

2. A liquid crystal display apparatus as claimed in claim 1, wherein a retardation of said liquid crystal layer in said reflective display portion is a quarter wave.

3. A liquid crystal display apparatus comprising:
   a first substrate;
   a second substrate;
   a liquid crystal layer laid between said first and second substrates;
   said second substrate having a pixel electrode and a common electrode so that an electric field may be applied between said pixel electrode and said common electrode in substantially parallel to said substrate surface, for driving said liquid crystal layer;
   one pixel having a reflective display portion and a transmissive display portion;
   a first polarizer and a second polarizer located outsides of said first and second substrates;
   an alignment layer imparting to the liquid crystal aver a first liquid crystal alignment direction in said transmissive display portion and a second liquid crystal alignment direction in said reflective display portion; and
   said first and second polarizers having their transmissive axes crossed with each other at right angles, and wherein the first liquid crystal alignment direction in the transmissive display portion is located in parallel to any one of transmissive axes of said first and second polarizers and the second liquid crystal alignment direction in the reflective display portion is crossed with the transmissive axes of said first and second polarizers at an angle of 40 to 50 degrees at least on the boundary closer to a light incident plane.

* * * * *